United States Patent
Longenecker et al.

(10) Patent No.: US 8,915,547 B2
(45) Date of Patent: Dec. 23, 2014

(54) SYSTEM FOR ENGAGING MULTI-COMPONENT CARSEAT

(71) Applicant: Artsana USA, Inc., Lancaster, PA (US)

(72) Inventors: Michael L. Longenecker, Lancaster, PA (US); Bruce L. Williams, Denver, PA (US)

(73) Assignee: Artsana USA, Inc., Lancaster, PA (US)

( * ) Notice: Subject to any disclaimer, the term of this patent is extended or adjusted under 35 U.S.C. 154(b) by 0 days.

(21) Appl. No.: 13/765,408

(22) Filed: Feb. 12, 2013

(65) Prior Publication Data

US 2013/0154323 A1  Jun. 20, 2013

Related U.S. Application Data

(63) Continuation of application No. 13/289,018, filed on Nov. 4, 2011, now Pat. No. 8,393,679, which is a continuation of application No. 12/573,484, filed on Oct. 5, 2009, now Pat. No. 8,056,975, which is a continuation of application No. 11/108,293, filed on Apr. 18, 2005, now Pat. No. 7,597,396.

(60) Provisional application No. 60/567,307, filed on Apr. 30, 2004.

(51) Int. Cl.
| | |
|---|---|
| B60N 2/28 | (2006.01) |
| A47D 1/10 | (2006.01) |
| B62B 9/12 | (2006.01) |
| B62B 7/14 | (2006.01) |

(52) U.S. Cl.
CPC ............. *B62B 9/12* (2013.01); *B60N 2/2848* (2013.01); *B60N 2/2863* (2013.01); *B60N 2/289* (2013.01); *B60N 2/2821* (2013.01); *B60N 2/2845* (2013.01); *B60N 2/2812* (2013.01); *B60N 2/2875* (2013.01); *B62B 7/145* (2013.01); *B60N 2/2887* (2013.01); *B60N 2/2806* (2013.01)
USPC .................................................. 297/256.16

(58) Field of Classification Search
USPC .......... 297/256.16, 130, 256.17, 252, 440.22, 297/250.1; 280/47.39, 47.38
See application file for complete search history.

(56) References Cited

U.S. PATENT DOCUMENTS

| | | |
|---|---|---|
| 1,451,655 A | 4/1923 | Gilley |
| 2,542,480 A | 2/1951 | Cramer et al. |

(Continued)

FOREIGN PATENT DOCUMENTS

| | | |
|---|---|---|
| DE | 4110010 A1 * | 10/1992 |
| EP | 0164909 | 5/1985 |

(Continued)

OTHER PUBLICATIONS

Colfer, J.T., Chair Height Adjustment Control Device, Technical Digest, No. 59, p. 5, Jul. 1980 (Abstract only).

(Continued)

*Primary Examiner* — Milton Nelson, Jr.
(74) *Attorney, Agent, or Firm* — Volpe and Koenig, P.C.

(57) ABSTRACT

A multi-point locking system for a carseat including a base having an upper surface, a lower surface, front and rear ends, and left and right sides, the lower surface dimensioned to rest upon a vehicle seat and a seat having a seating surface and an exterior surface, the exterior surface removably engagable with the upper surface of the base. Four locking points removably engage the seat to the base comprising two spaced apart rear locking points positioned toward the rear end of the base and two spaced apart front locking points positioned toward the front end of the base. An actuator control releases the engagement between the seat and the base.

13 Claims, 31 Drawing Sheets

(56) References Cited

U.S. PATENT DOCUMENTS

| | | | |
|---|---|---|---|
| 1,951,385 A | 3/1952 | Zeidler | |
| 2,664,140 A | 12/1953 | Kindelberger | |
| 3,198,575 A | 8/1965 | Hawkins | |
| 3,370,754 A | 2/1968 | Cook et al. | |
| 3,388,947 A | 6/1968 | Rosen | |
| 3,563,600 A | 2/1971 | Converse | |
| 3,625,563 A | 12/1971 | Dickinson | |
| 3,680,821 A | 8/1972 | Barriere | |
| 3,944,437 A | 3/1976 | Auerbach | |
| 4,099,770 A | 7/1978 | Elsholz et al. | |
| 4,205,877 A | 6/1980 | Ettridge | |
| 4,215,900 A | 8/1980 | Coult | |
| 4,334,709 A | 6/1982 | Akiyama et al. | |
| 4,591,208 A | 5/1986 | McDonald et al. | |
| 4,603,903 A | 8/1986 | Moscovitch | |
| 4,615,560 A | 10/1986 | Schaller | |
| 4,632,409 A * | 12/1986 | Hall et al. | 280/30 |
| 4,632,456 A | 12/1986 | Kassai | |
| 4,632,460 A | 12/1986 | Meeker et al. | |
| 4,662,682 A | 5/1987 | Maurel | |
| 4,770,468 A | 9/1988 | Shubin | |
| 4,798,379 A | 1/1989 | Jenkins | |
| 4,848,842 A | 7/1989 | Stringham | |
| 4,909,574 A | 3/1990 | Sedlack | |
| 4,943,113 A | 7/1990 | Meeker | |
| 5,052,749 A | 10/1991 | Groenendijk | |
| 5,058,283 A | 10/1991 | Wise et al. | |
| 5,098,157 A | 3/1992 | Surot | |
| 5,110,182 A | 5/1992 | Beauvais | |
| 5,183,311 A | 2/1993 | Meeker et al. | |
| 5,246,272 A | 9/1993 | Kato et al. | |
| 5,286,085 A | 2/1994 | Minami | |
| 5,318,347 A | 6/1994 | Tseng | |
| 5,326,067 A * | 7/1994 | Gonzalez | 248/503.1 |
| 5,363,518 A | 11/1994 | Mowery | |
| 5,382,079 A | 1/1995 | Wilson et al. | |
| 5,383,708 A | 1/1995 | Nagasaka et al. | |
| 5,384,946 A | 1/1995 | Sundstedt et al. | |
| 5,385,387 A | 1/1995 | Kain | |
| 5,551,751 A | 9/1996 | Sedlack et al. | |
| 5,558,400 A | 9/1996 | Poulson et al. | |
| 5,567,007 A | 10/1996 | Czernakowski et al. | |
| 5,584,532 A | 12/1996 | Marechal | |
| 5,590,934 A | 1/1997 | Gibbs | |
| 5,599,063 A | 2/1997 | Lister et al. | |
| 5,625,956 A | 5/1997 | Cone et al. | |
| 5,645,317 A | 7/1997 | Onishi et al. | |
| 5,725,278 A | 3/1998 | Verbeek | |
| 5,746,478 A | 5/1998 | Lumley et al. | |
| 5,772,279 A * | 6/1998 | Johnson, Jr. | 297/130 |
| 5,788,326 A | 8/1998 | Kawade et al. | |
| 5,810,436 A | 9/1998 | Surot | |
| 5,820,144 A * | 10/1998 | Wang | 280/47.38 |
| 5,836,650 A | 11/1998 | Warner, Jr. et al. | |
| 5,947,562 A | 9/1999 | Christofferson et al. | |
| 5,957,531 A | 9/1999 | Kane et al. | |
| 5,961,180 A | 10/1999 | Greger et al. | |
| 6,000,753 A | 12/1999 | Cone, II | |
| 6,067,674 A | 5/2000 | Moser | |
| 6,070,890 A | 6/2000 | Haut et al. | |
| 6,247,208 B1 | 6/2001 | Creech | |
| 6,260,920 B1 * | 7/2001 | Tolfsen | 297/256.16 |
| 6,318,799 B1 | 11/2001 | Greger et al. | |
| 6,322,142 B1 | 11/2001 | Yoshida et al. | |
| 6,347,832 B2 | 2/2002 | Mori | |
| 6,428,100 B1 | 8/2002 | Kain et al. | |
| 6,446,990 B1 * | 9/2002 | Nania et al. | 280/47.371 |
| 6,485,101 B2 | 11/2002 | Kassai et al. | |
| 6,543,846 B2 | 4/2003 | Cone | |
| 6,592,183 B2 | 7/2003 | Kain | |
| 6,705,675 B1 | 3/2004 | Eastman et al. | |
| 6,705,676 B1 | 3/2004 | Berringer et al. | |
| 6,715,828 B1 | 4/2004 | Cheng | |
| 6,863,345 B2 | 3/2005 | Kain | |
| 6,908,151 B2 | 6/2005 | Meeker et al. | |
| 6,938,623 B2 | 9/2005 | Graupner et al. | |
| 7,004,541 B2 | 2/2006 | Sedlack | |
| 7,044,548 B2 | 5/2006 | Mullen et al. | |
| 7,083,237 B2 | 8/2006 | Horton et al. | |
| 7,201,452 B1 | 4/2007 | Franks | |
| 2001/0043001 A1 | 11/2001 | Kassai et al. | |
| 2002/0033621 A1 | 3/2002 | Kelly | |
| 2002/0063450 A1 | 5/2002 | Washizuka et al. | |
| 2003/0151220 A1 | 8/2003 | Hou | |
| 2003/0151282 A1 | 8/2003 | Williams | |
| 2003/0151286 A1 | 8/2003 | Kain | |
| 2003/0160485 A1 | 8/2003 | Mullen et al. | |
| 2003/0164627 A1 | 9/2003 | Sedlack | |
| 2003/0164631 A1 | 9/2003 | Sedlack | |
| 2003/0221294 A1 | 12/2003 | Kukuda et al. | |
| 2005/0006934 A1 | 1/2005 | Rabeony et al. | |
| 2005/0173479 A1 | 8/2005 | Gentil | |

FOREIGN PATENT DOCUMENTS

| | | |
|---|---|---|
| EP | 0560184 | 9/1993 |
| EP | 0627339 | 7/1994 |
| EP | 0640508 | 3/1995 |
| EP | 0751033 | 1/1997 |
| EP | 0901953 | 3/1999 |
| EP | 0949113 | 10/1999 |
| EP | 1152918 | 11/2003 |
| GB | 171973 | 12/1922 |
| GB | 212063 | 3/1924 |
| GB | 486222 | 2/1938 |
| GB | 1303386 | 1/1973 |
| GB | 2231537 A1 | 11/1990 |
| GB | 2350289 | 11/2000 |
| WO | 9715469 | 5/1997 |

OTHER PUBLICATIONS

Pain et al, Multi-adjustable chair for children with disabilities, Journal of Medical Engineering & Technology, vol. 20, Issue 4 and 5, Jul. 1996, pp. 151-156 (Abstract only).

Evenflo® On My Way Position RightTM V Infant Car Seat (1999).

Evenflo® Discovery Adjust RightTM Infant Car Seat (1999).

Evenflo® Easy Comfort ClassicTM Travel System (1999).

Evenflo® Easy Comfort PlusTM Travel System (1999).

Evenflo® Easy Comfort PremierTM Travel System (1999).

National Highway Traffic Safety Administration Final Rule regarding standardized LATCH-system requirements available from the website as http:www.nhtsa.gov/Laws+&+Regulations/Child+Passenger+Safety, made law pursuant to 49 C.F.R. parts 571 and 596, effective Sep. 1999.

Safe Ride News, "Protecting Children in Traffic," (Jan./Feb. 2003), vol. XXI, No. 1, pp. 1-8.

Safe Ride News, "Protecting Children in Traffic," (Mar./Apr. 2003), vol. XXI, No. 2, pp. 1-8.

Safe Ride News, "Protecting Children in Traffic," (Sep./Oct. 2003), vol. XXI, No. 5, pp. 1-8.

Safe Ride News, "Protecting Children in Traffic," (Nov./Dec. 2003), vol. XXI, No. 6, pp. 1-8.

Safe Ride News, "Protecting Children in Traffic," (May/Jun. 2004), Summer Supplement, Vol. XXII, No. 3-S, pp. 1-2.

Safe Ride News, "Protecting Children in Traffic," (Sep./Oct. 2004), Vol. XXII, No. 5, pp. 1-8.

Arbogast et al., "Showing (Motor Vehicle) Restraint: A Primer for Emergency Physicians," Clin. Ped. Emerg. Med. 4:90-102 (2003).

Washington State Booster Seat Coalition, "Is Your Child Ready for a Seat Belt? Think Again!" (Aug. 2003).

Fields, et al. "Baby Bargains Secrets," pp. 325-386, 5th Edition (2004).

Fields, et al. "Baby Bargains Secrets," pp. 337-406, 6th Edition (2004).

Sunshine Kids Amended Answer, Affirmative Defenses and Counterclaims to Plaintiff's Complaint for Patent Infringement (filed Jun. 22, 2010).

(56) References Cited

OTHER PUBLICATIONS

Sunshine Kids Initial Non-Infringement, Unenforceability and Invalidity Contentions (dated Aug. 9, 2010).
Defendant's Responses and Objections to Plaintiff's First Set of Interrogatories (dated Aug. 24, 2010).
European Search Report issued on Sep. 14, 2009 in counterpart European Patent Application No. 05 10 3427.
Examination Report issued on Oct. 11, 2010 in counterpart European Patent Application No. 05 10 3427.
Office Action in Ex Parte Reexamination issued on Jan. 7, 2011 in U.S. Appl. No. 90/011,164.
Mar. 30, 2012 Order granting reexamination in counterpart U.S. Appl. No. 90/009,987.
Office Action issued Jun. 19, 2012 in counterpart U.S. Reexamination Control No. 90/009,987.

* cited by examiner

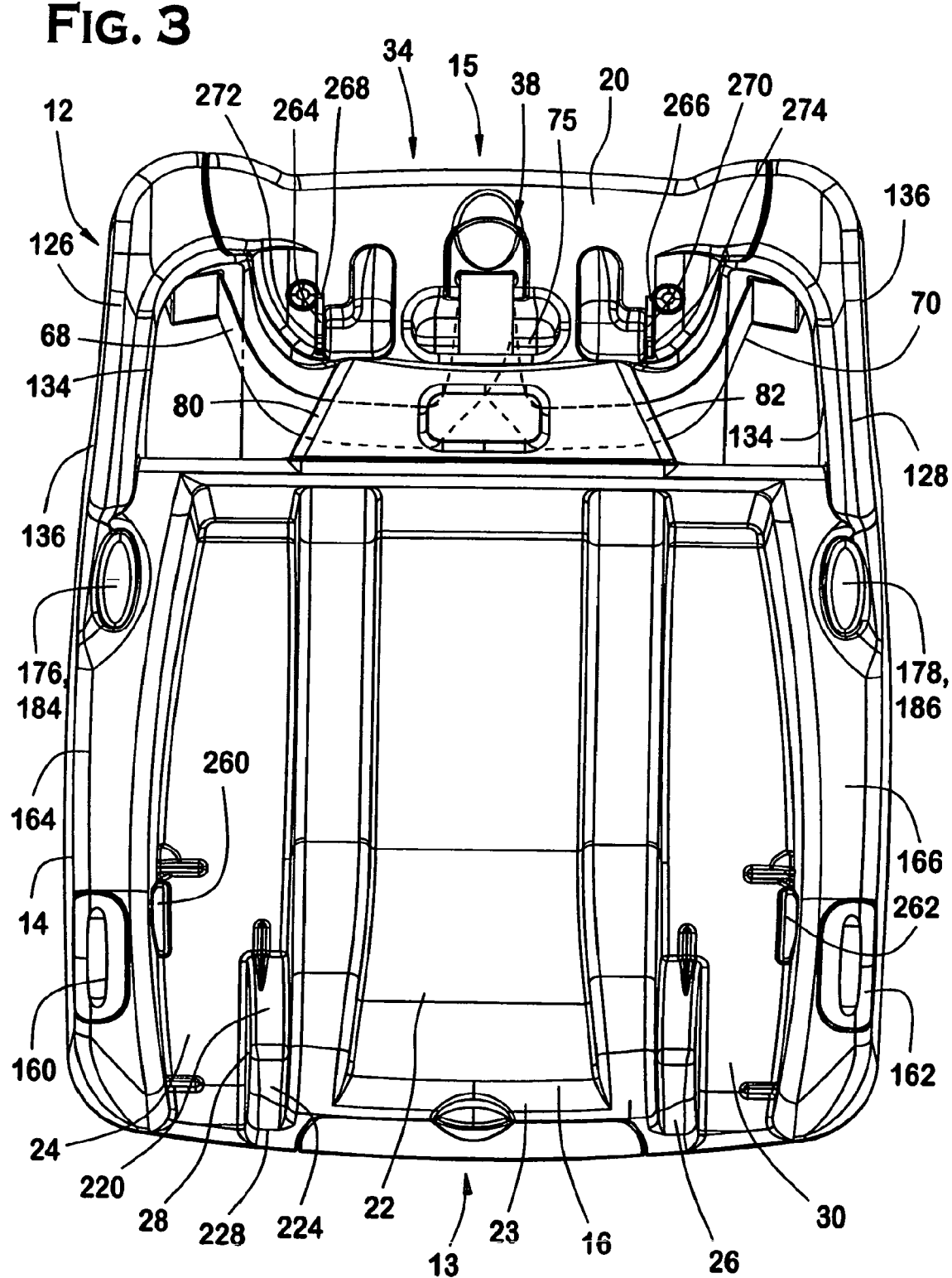

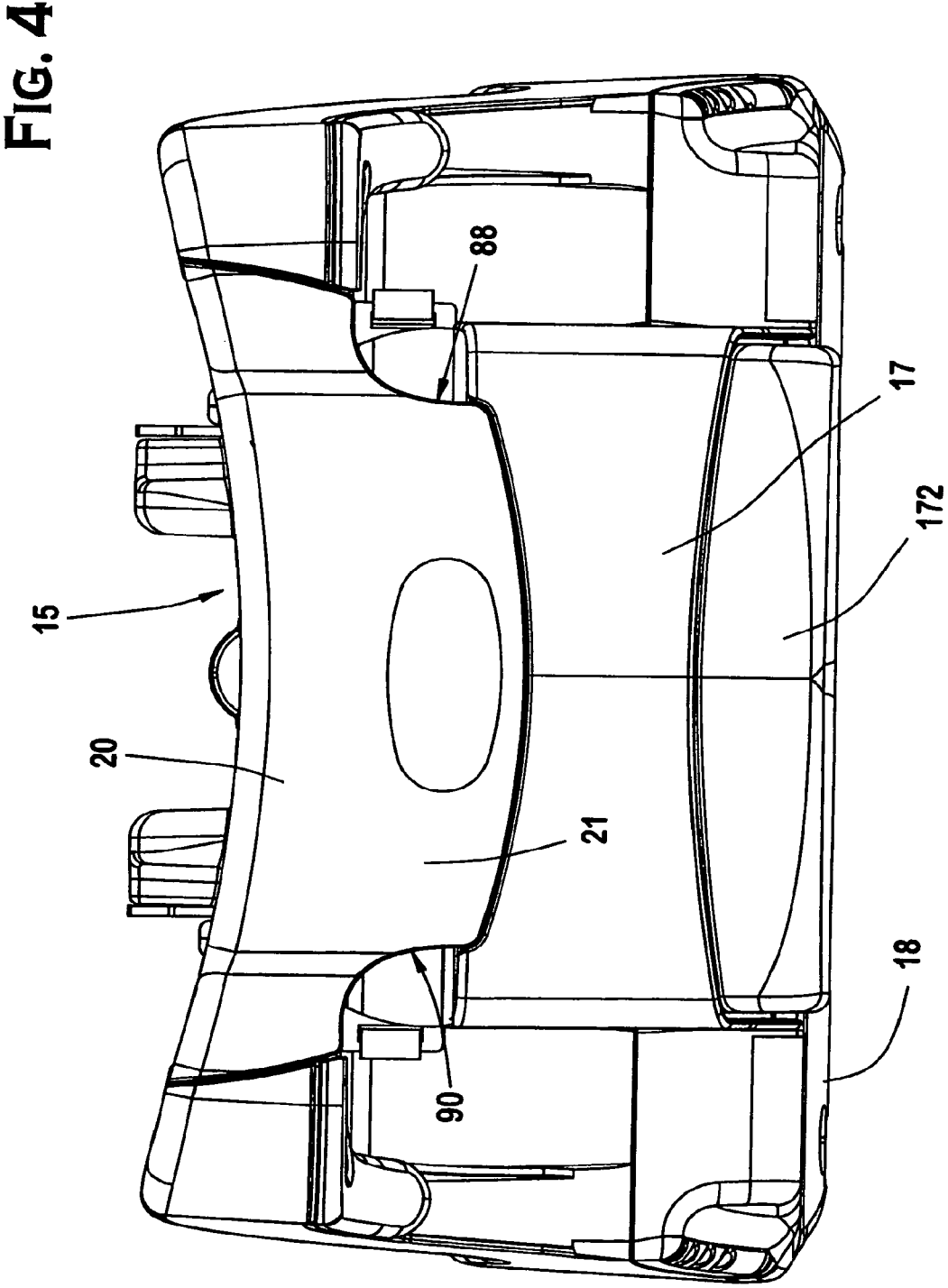

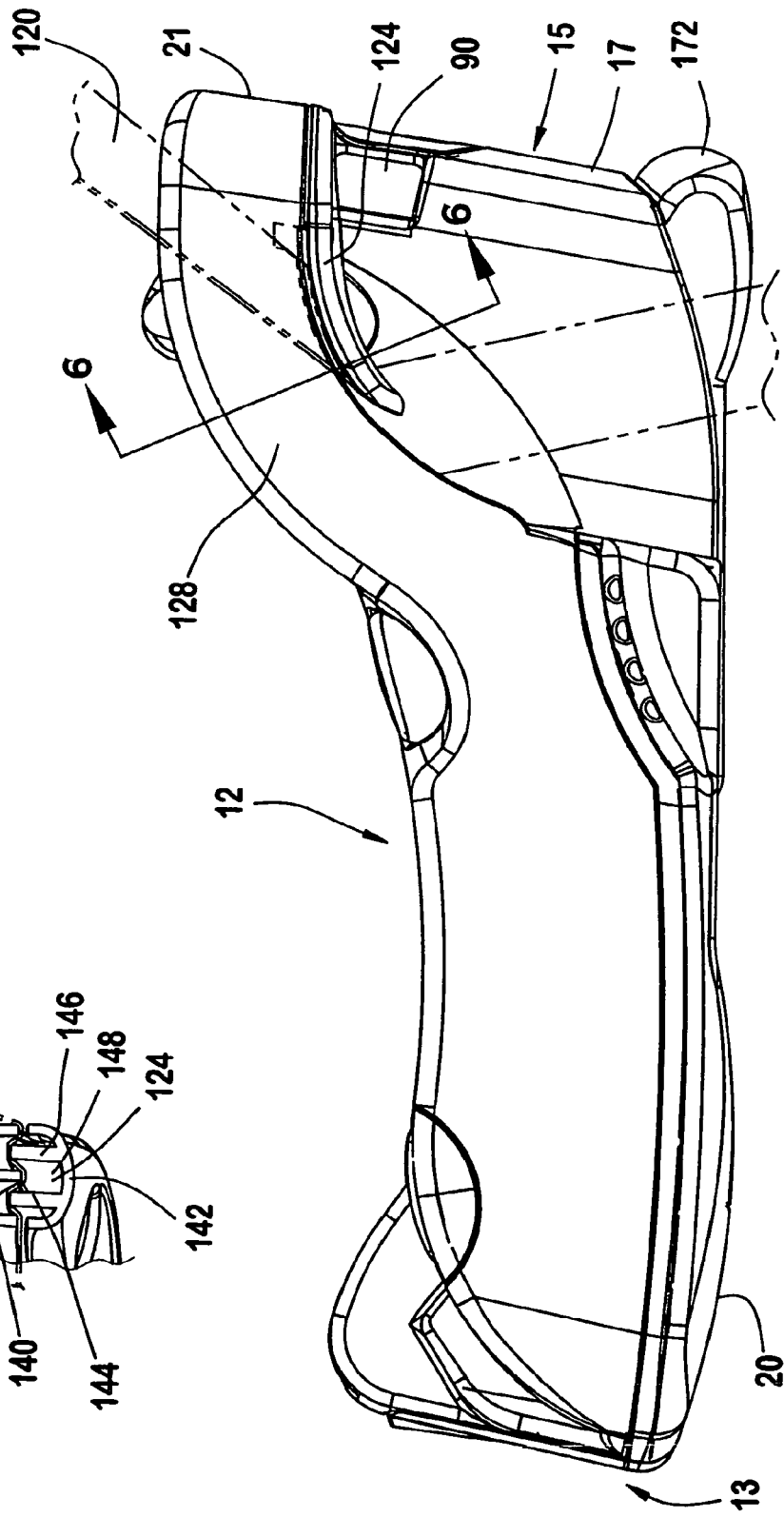

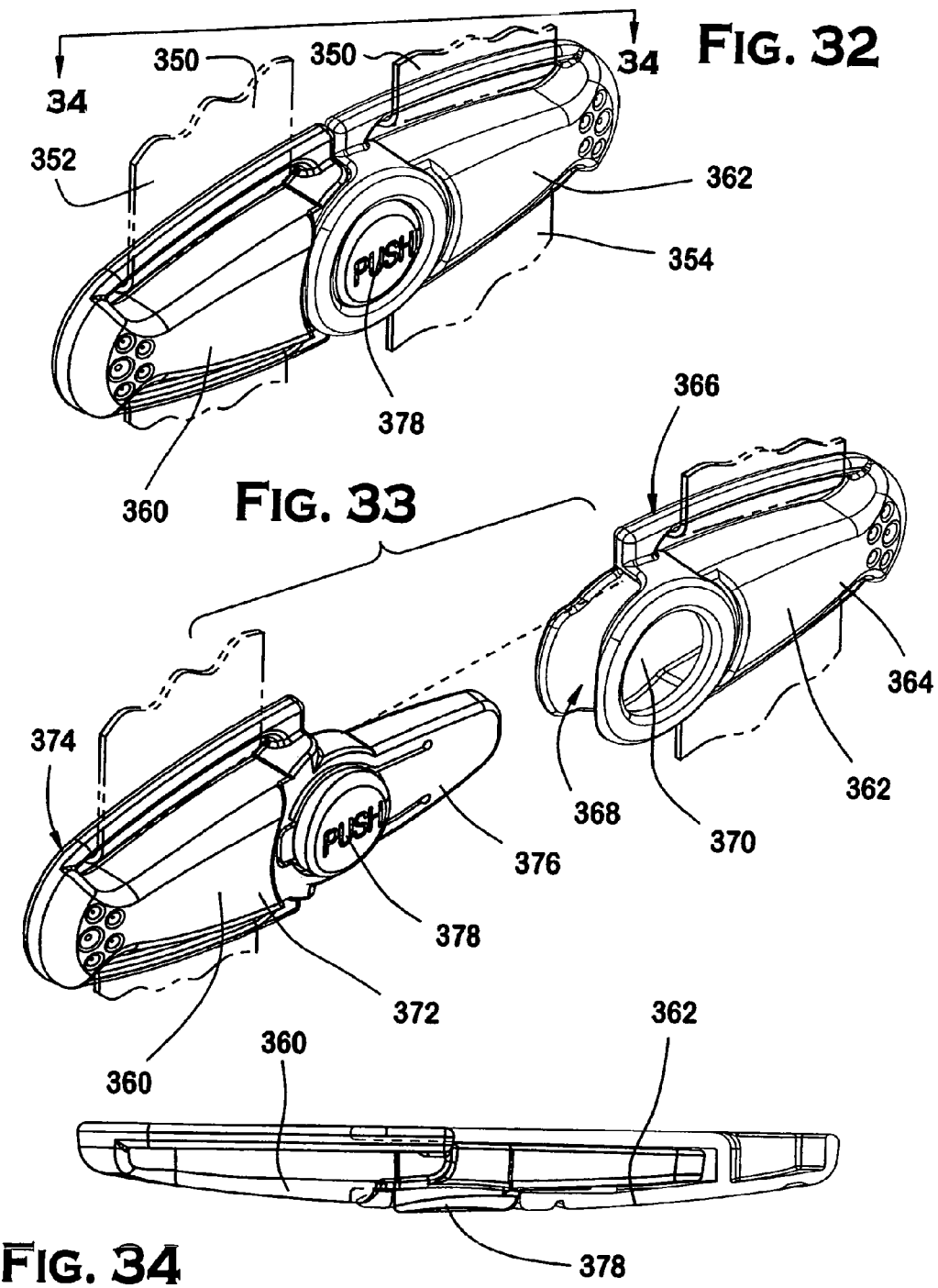

SYSTEM FOR ENGAGING MULTI-COMPONENT CARSEAT

CROSS REFERENCE TO RELATED APPLICATIONS

This application is a continuation of U.S. patent application Ser. No. 13/289,018, filed Nov. 4, 2011, which is a continuation of U.S. patent application Ser. No. 12/573,484, filed Oct. 5, 2009, now U.S. Pat. No. 8,056,975, which is a continuation of U.S. patent application Ser. No. 11/108,293, filed Apr. 18, 2005, now U.S. Pat. No. 7,597,396, which claims the benefit of U.S. Provisional Patent Application No. 60/567,307 filed on Apr. 30, 2004, all of which are incorporated by reference as if fully set forth.

FIELD OF INVENTION

The present invention relates generally to infant travel systems which include an infant travel seat that can be mounted to a stationary or mobile base. More particularly, the present invention relates to a restraint system for securing a base component of the infant travel system to a vehicle seat, a leveling system for the base, a multi-point locking system to secure an infant travel seat to a complimentary base, and a travel seat carrying handle assembly.

BACKGROUND

Infant travel systems comprising an infant travel seat and complimentary base assembly are well-known in the art. In many infant travel systems, the engaging mechanisms between the infant travel seat and the base is difficult to operate or does not form a secure fit. Also, the location of the engagement between the seat and base in prior art systems is not optimally positioned to account for the various effects of front and rear end collisions. Therefore, there is a need for a more user friendly system for engaging and releasing the infant travel seat to and from the base. There is also a need for a more secure and well-balanced engagement between the engaging mechanism on the infant travel seat and the base.

In many infant travel systems, it is often difficult for a user to operate a self-contained restraint system carried by the base assembly to form a secure connection between the restraint system and an anchor mounted within the vehicle. For example, a user may be required to access the restraint system from only one side of the base assembly, or may have to be put in an awkward position within the vehicle to operate the restraint system. In addition, securing straps of the restraint system clutter the base assembly and can interfere with the engagement between an infant travel seat and the base assembly causing a potential safety hazard. Therefore, there is a need for a more user friendly self-contained base assembly restraint system to form a tight connection between the base and anchor mounted in a vehicle. In addition, there is a need for a base assembly restraint system having the securing straps concealed or displaced from interfering with the attachment of an infant travel seat to the base assembly.

In many infant travel systems, a leveling system is typically located on either the base or seat. When the indicator is positioned on the seat, the seat is required to be mounted to the base for a user to read the level. If the base needs to be adjusted, the seat typically has to be disengaged from the base, which can be frustrating for a user. When the level is located on the base, it is often concealed by the seat or can only be read from one side of the base. Finally, prior art leveling systems, typically in the form of a pendulum with an indicator, can be confusing for a user to read and are not user friendly. Therefore, there is a need for an improved and more user friendly leveling system to be located on the base assembly.

Adjustable carrying handles for infant travel seats are well known. In many infant travel seats, the position of the carrying handle can break free when minimum force is applied. This is because there is typically only a singular locking engagement between the handle and seat or the adjustable locking engagement between the handle and seat is perpendicular to the radial rotation of the handle. Therefore, there is a need for an adjustable handle locking mechanism having an improved engagement between the handle and seat.

SUMMARY

One aspect of the present invention is directed to an infant travel seat base. The base includes a frame dimensioned to rest upon a vehicle seat, defines front and rear portions, and a center line. An adjustment assembly is coupled to the frame and includes a locking element. The adjustment assembly is positioned at a selected one of the front and rear portions of the frame. The base further includes a tether having a free end which is releasably secured in the locking element of the adjustment assembly, and at least one securing end adapted to be secured to an anchor mounted within the vehicle so that movement of the tether through the locking element adjusts the position of the securing end with respect to the frame.

Another aspect of the present invention is directed to a restraint system for an infant travel seat base. The restraint system includes an infant travel seat base dimensioned to rest upon a vehicle seat. The base defines front and rear portions, upper and lower planes, and a center line. At least one adjustment assembly is coupled to the base and includes a locking element. The adjustment assembly is positioned at a selected one of the front and rear portions of the base. The restraint system further includes at least one tether having a central portion releasably secured in the locking element, and two end portions adapted to be secured to an anchor mounted within the vehicle so that movement of the tether through the locking element adjusts the position of the end portions with respect to the base.

Another aspect of the present invention is directed toward a base for supporting an infant travel seat including a frame and at least one liquid bubble level positioned within the frame. The frame includes a front end, a rear end, two opposed sides, an upper surface that receives an infant travel seat, and a lower surface configured to rest upon a vehicle seat.

Another aspect of the present invention is directed toward an infant travel seat. The infant travel seat includes a shell having a seating portion and two opposing side hubs. Each hub has a central axis, and at least one of the hubs has a plurality of circumferential projections extending toward the center of the hub and positioned radial to the central axis. The infant travel seat further includes a handle rotatably connected to the frame. The handle includes two arms, each arm having a hub receiving portion. The hub receiving portion of each arm is adapted to be secured to one of the hubs of the shell. The infant travel seat further includes at least one locking member connected to the handle, wherein the locking member has at least one engaging portion releasably engageable with at least one of the plurality of circumferential projections. The locking member is biased by a handle actuator disposed on the handle to form a radial engagement with at least one of the circumferential projections. The handle actuator is adapted to disengage the radial engagement of the locking member with the at least one circumferential projection by displacing the locking member sufficiently from the plurality of circumferential projections to allow the locking member to rotate on a radial axis with respect to the central axis and adjust the position of the radial engagement of the locking member with at least one the plurality of circumferential projections.

Another aspect of the present invention is directed toward an infant travel system. The infant travel system includes a base assembly and an infant travel seat. The base assembly includes front and rear ends and two opposed sides that define a generally rectangular cuboid having upper and lower surfaces. The lower surface is configured to rest upon a vehicle seat, and the upper surface is configured to receive a complimentary infant travel seat. The base assembly further includes opposed securing latches positioned at one end of the base for securing an infant travel seat. The infant travel seat includes a shell having a head end, a foot end, and opposing sides defining a seat. The seat has an interior and exterior. The shell further defines opposed receptacles positioned at the foot end of the seat; the opposed receptacles are configured to receive the opposed securing latches of the base. An actuating assembly is located on the interior of the seat to control the engagement between the opposed receptacles of the seat and the opposed securing latches of the base.

BRIEF DESCRIPTION OF THE DRAWINGS

The foregoing summary, as well as the following detailed description of preferred embodiments of the invention, will be better understood when read in conjunction with the appended drawings. In the drawings:

FIG. 3 is a plan view of the base assembly in the direction of the arrow B in FIG. 2.

FIG. 4 is an elevational view of the base assembly in the direction of arrow C in FIG. 1.

FIG. 5 is an elevational view of the base assembly in the direction of arrow D in FIG. 1.

FIG. 6 is a cross-sectional view of a vehicle belt lockoff clip of the base assembly along the line 6-6 of FIG. 5.

FIG. 32 is a front view of a harness chest clip usable with the infant travel seat shown in an engaged position.

FIG. 33 is a front view of the harness chest clip of FIG. 32 shown in an opened condition.

FIG. 34 is a plan view in the direction of the line 34 in FIG. 32.

DETAILED DESCRIPTION OF THE PREFERRED EMBODIMENTS

Figure 1:
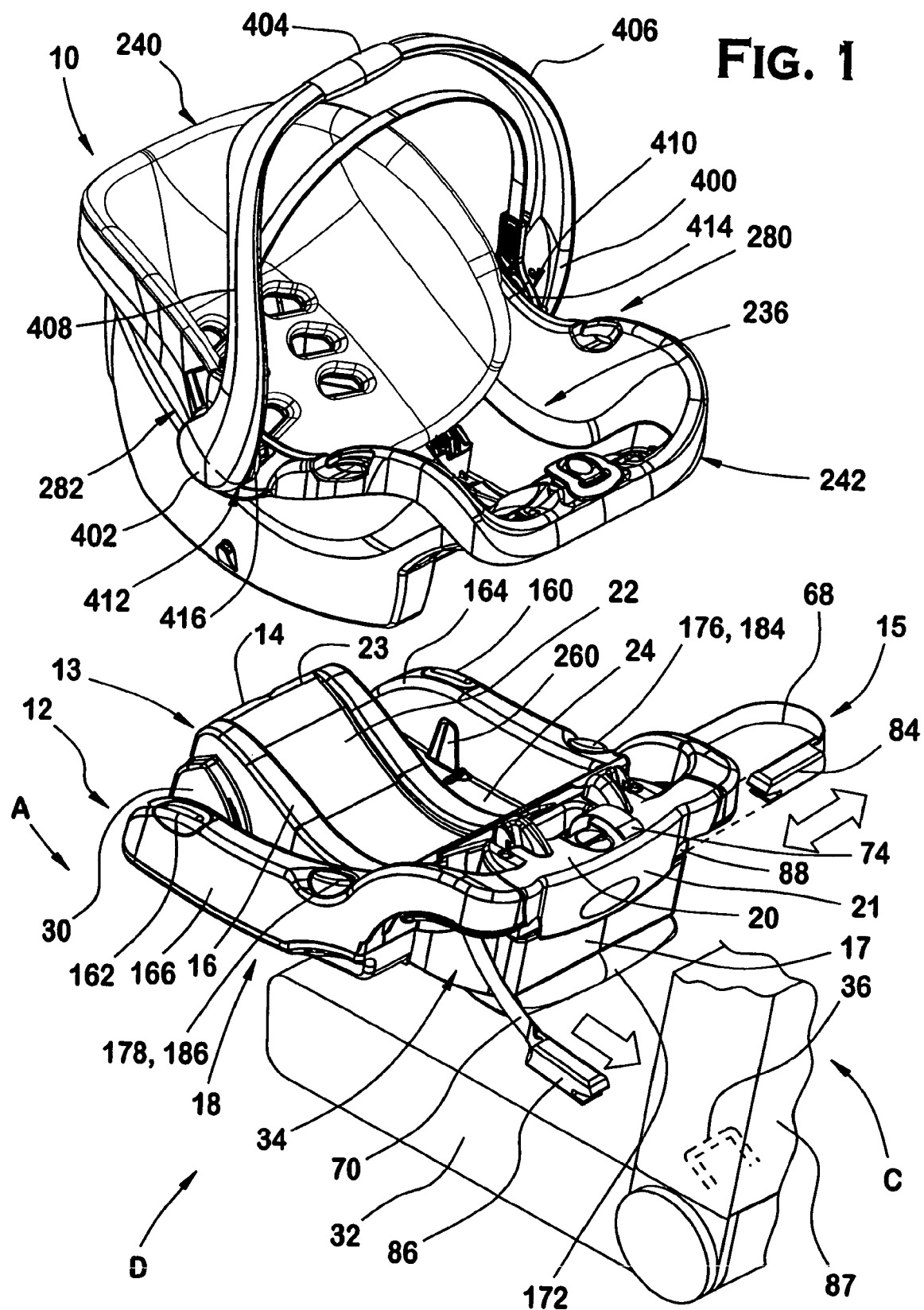
FIG. 1 is an exploded view of an infant travel seat and base assembly according to the invention.

Certain terminology is used in the following description for convenience only and is not limiting. The words "right,"

"left," "top," "bottom," "side," "front," and "rear" designate positions in the drawings to which reference is made. The words "inwardly" and "outwardly" refer to directions toward and away from, respectively, the geometric center of the infant travel system and designated parts thereof.

With reference to FIGS. 1-42, wherein like numerals indicate like elements throughout, preferred embodiments of the invention will be described below.

FIGS. 1-5 show a preferred embodiment of the infant travel seat 10 and base assembly 12 of the present invention. Referring to FIG. 1, the base assembly preferably includes a frame 14 comprised of an upper base cover 16, a lower base cover 18, and a rear base cover 20. The base assembly has a front end 13 and a rear end 15. The upper base cover 16 preferably has a curved platform 22 positioned between opposing side channels 24, 26 to receive a complimentary infant travel seat 10. The front end 23 of the curved platform 22 forms a point of highest reference with respect of the curved platform 22. A pair of angled guiding extensions 28, 30 project outwardly from the curved platform 22 into the opposed side channels 24, 26 at the front end 13 of the base assembly to assist mounting of a complimentary infant travel seat 10 having mating grooves on the base assembly 12. The lower base cover 18 is generally horizontal to rest on a vehicle seat 32. A base storage compartment 31 can be formed between the curved platform 22 and the lower base cover 18, and can be enclosed by a base storage door 33.

Figure 7:
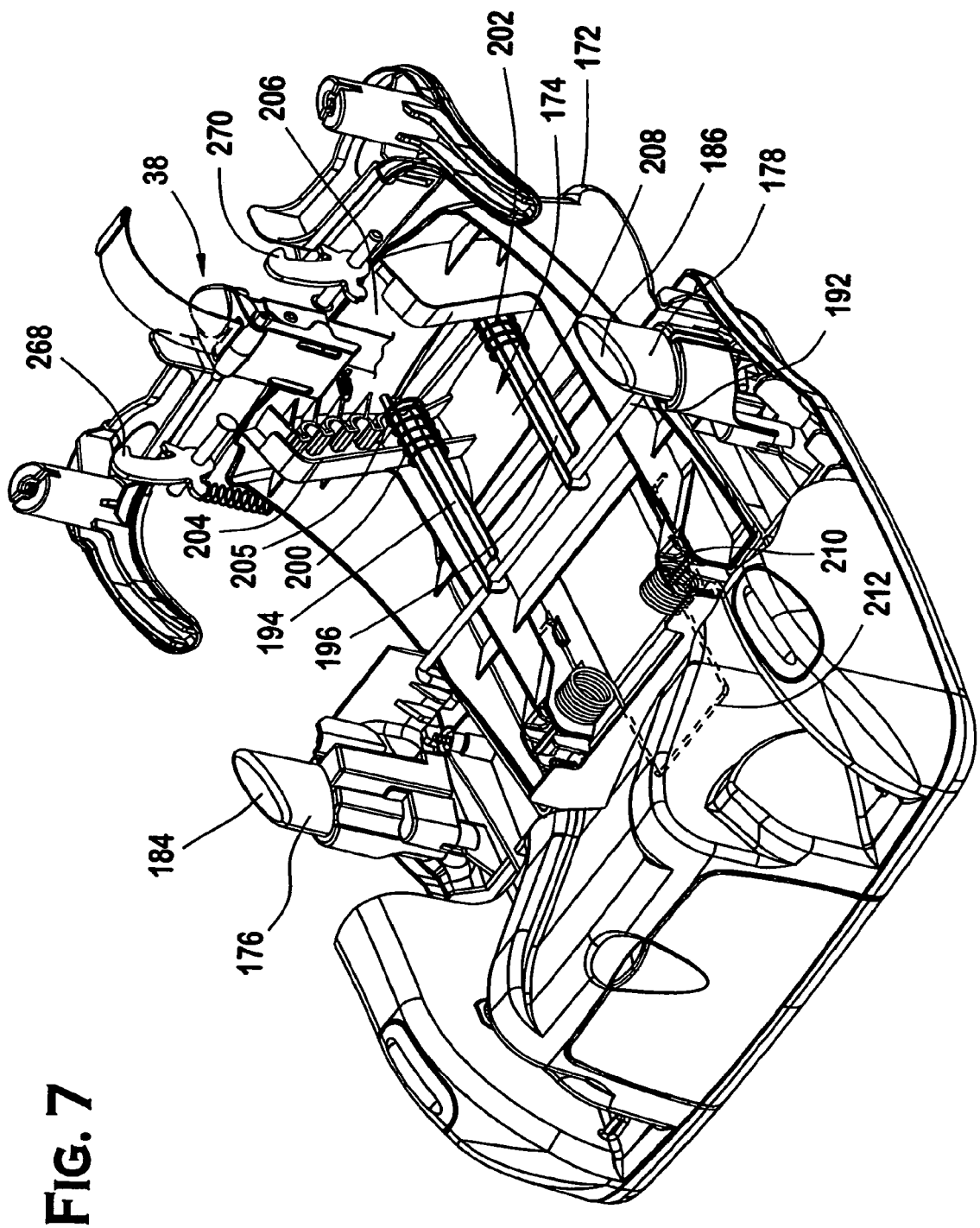
FIG. 7 is an internal view of the base assembly of FIG. 2 with the upper and rear base covers removed.
Figure 11:
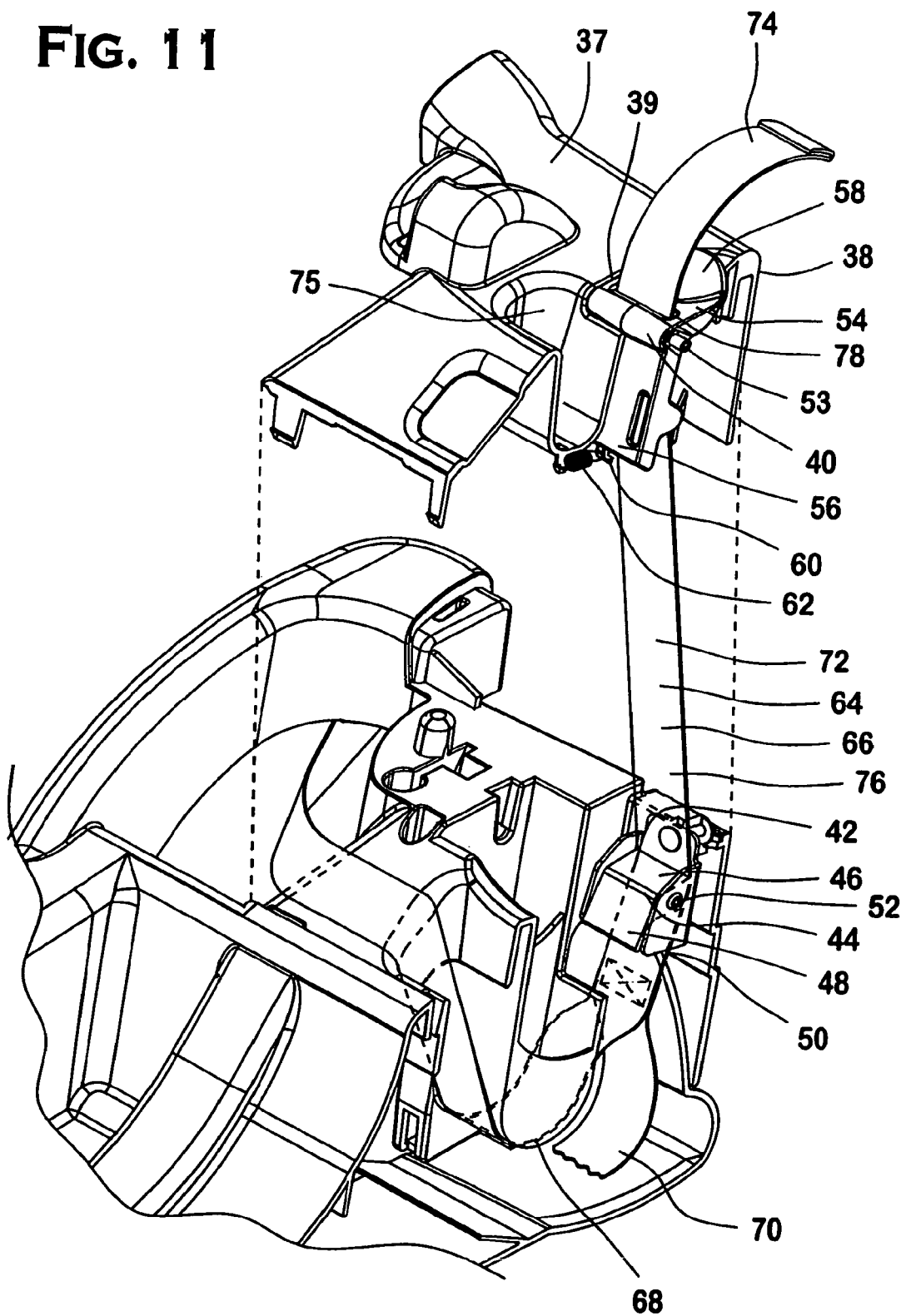
FIG. 11 is a partial cross-sectional view of the tether assembly of FIG. 8 with the rear base cover and tether adjustment tab exploded from the base assembly.

The base assembly 12 also includes a self-contained restraint system 34 positioned at the rear end 15 of the base assembly 12 to secure the base assembly 12 to a vehicle having an anchor 36 mounted within a vehicle in proximity to the vehicle seat 32. Referring to FIG. 3, a first embodiment of the restraint system 34 includes an adjustment assembly 38 coupled to the rear base cover 20 of the frame 14. An upper surface 37 of the rear base cover 20 preferably includes an aperture 39 at the upper surface to receive the adjustment assembly 38 within the frame 14 at the center of the frame 14. As shown in FIGS. 7 and 11, the adjustment assembly 38 is preferably comprised of an adjustment tab 40 and locking assembly 42. With reference to FIG. 11, the locking assembly can be an A-frame type lock such as the A38298 Adjuster by Indiana Mills and Manufacturing, Inc; however, any suitable locking assembly can be used. The locking assembly 42 preferably includes an A-frame member 44 having first and second ends 46, 48. The A-frame member 44 is pivotally secured to a housing 50 by a fastener 52 which can be a screw, pin, or any acceptable fastening means. The A-frame member 44 is secured to the housing 50 such as to limit the rotation of the A-frame member 44 about the fastener 52. The housing 46 is preferably is secured to the frame 14.

The adjustment tab 40 overlays the locking assembly 42 and is pivotally secured to the rear base cover 20 by fastener 53, which can be a screw, pin, or any acceptable fastening means. The adjustment tab 40 is substantially L-shaped and has first and second ends 54, 56. The first end 54 of the adjustment tab 40 is preferably exposed through the aperture 39 of the rear base cover 20 and has a lip 58 to allow a user to grasp and pull the adjustment tab 40 in a direction toward the front end 13 of base assembly 12. The second end 56 of the adjustment tab 40 is received vertically within the frame 14 and forms a substantially parallel plane of symmetry to the plane of the second end 48 of the A-frame member 48.

The second end 56 of the adjustment tab also includes a hook 60 to which a spring 62 is attached to connect the second end 56 of the biasing member 50 to the frame 14. The spring limits the rotation of the adjustment tab 40 about the fastener 53 and biases the adjustment tab 40 in a manner such as to keep the first end 54 of the adjustment tab 40 in a generally planar orientation with respect to the upper surface 37 of the rear base cover 14. In a resting state, the first end 46 of the A-frame member 44 pivotally abuts the housing 50.

Still with reference to FIG. 11, when a force is exerted on lip 58 of the first end 54 to pull the lip 58 upward and toward the front end 13 of the base assembly 12 (see FIG. 1), the second end 56 of the adjustment tab 40 pivots in a direction toward the rear end 15 of the base assembly 12 thereby exerting a force on the second end 48 of the A-frame member 44 causing the second end 48 of the A-frame member 44 to pivot toward the rear end 15 of the base assembly 12. When the second end 48 of the A-frame member 44 pivots toward the rear end 15 of the base assembly 12, the first end 46 of the A-frame member 44 pivots away from the housing 50 creating a gap between the first end 46 of the A-frame member 44 and the housing 50.

The restraint system 34 of the first embodiment further includes a tether 64, preferably in the form of a Y-shaped strap 66 having divergent ends 68, 70 and a central leg end 72. Alternatively, the tether 64 may be a simple two ended strap. The tether 64 is preferably made of a webbing material and preferably has a width between 1-1½ inches. The central leg end 72 of the Y-shaped strap 66 has an exposed portion 74 and an interior portion 76 that is received into the interior of the frame 14. The interior portion 76 of the central leg end 72 is connected to the divergent ends 68, 70 of the Y-shaped strap member within the interior of the frame 14. Working from the interior of the frame to the exterior, the interior portion 76 of the central leg end 72 passes between the first end 46 of the A-frame member 44 and the housing 50 of the locking assembly 42, thereby being sandwiched between the first end 46 of the A-frame member 44 and the housing 50 of the locking assembly 42 when the adjustment assembly 38 is in the resting state. The interior portion 76 of the central leg end 72 continues upwardly passing through tab slot 78 on the first end 54 of the adjustment tab 40. The exposed portion 74 of the central leg 72 then extends out of the frame 14. The exposed portion of the central leg 72 can be tucked into a pocket 75 on the rear base cover 20 (see FIG. 3). Similarly, working from the interior of the frame 14 to the exterior, each divergent end 68, 70 of the Y-shaped strap respectively exits the interior of the frame 14 preferably through side slots 80, 82 (FIG. 3) formed between the upper base cover 16 and the rear base cover 20.

Each of the divergent ends preferably have a latch securing assembly, which can be a left hand or right hand Mini-Connector, (models A38214AB, and A38213AB) made by Indiana Mills and Manufacturing, Inc. However, any similar securing assembly can be used. Each of the latch securing assemblies 84, 86 are secured to one or more anchors 36 mounted within a vehicle, preferably to the chassis, in proximity to a vehicle seat 32 (FIG. 1).

When the restraint system 34 of the first embodiment is in use, each latch securing assembly 84 and 86 is secured to a vehicle anchor 36. The latch securing assemblies can be stored in two opposed cavities 88, 90 formed at the rear end 15 of the frame from connection of the rear base cover 20 to the upper base cover 16 (see FIG. 1, 4, 5) and removed when desired to attach to the vehicle. In order to extend the divergent ends 68, 70 of the Y-shaped strap member 66, a user pulls on the respective divergent end 68, 70 while pulling upward on the lip 58 of the first end 54 of the adjustment tab 40. As described in detail above, pulling upwardly on the lip 58 of the first end 54 of the adjustment tab 40 creates a gap between the first end 46 of the A-frame member 44 and the interior portion 76 of the central leg end 72 of the Y-shaped strap 66 to allow the interior portion 76 of the central leg end 72 of the Y-shaped strap 66 to move downwardly through the adjustment assembly 38, thereby allowing a greater length of the divergent ends 68, 70 to pass through the side slots 80, 82 and be exposed from the interior of the frame 14.

Once the latch securing assembly 84 and 86 are secured to a vehicle anchor(s) 36, the exposed portion 74 of the central leg 72 of the Y-shaped strap 66 is used to adjust the position of the frame 14 with respect to a vehicle seat back 87. Pulling the exposed portion 74 of the central leg 72 of the Y-shaped strap 66 upwardly causes the interior portion 76 of the central leg end 72 of the Y-shaped strap to move upwardly through the adjustment assembly 38, thereby creating a greater length of the exposed portion 74 of he central leg end 72 and decreasing the exposed length of both of the divergent ends 68, 70 of the Y-shaped strap 66. It should be noted that the first end 46 of the A-frame member 44 of the locking assembly 42 is adapted to allow the interior portion 76 of the central leg end 72 of the Y-shaped strap 66 to move upwardly without requiring a user to pull up on the lip 58 of the first end 54 of the adjustment tab 40.

Figure 42:
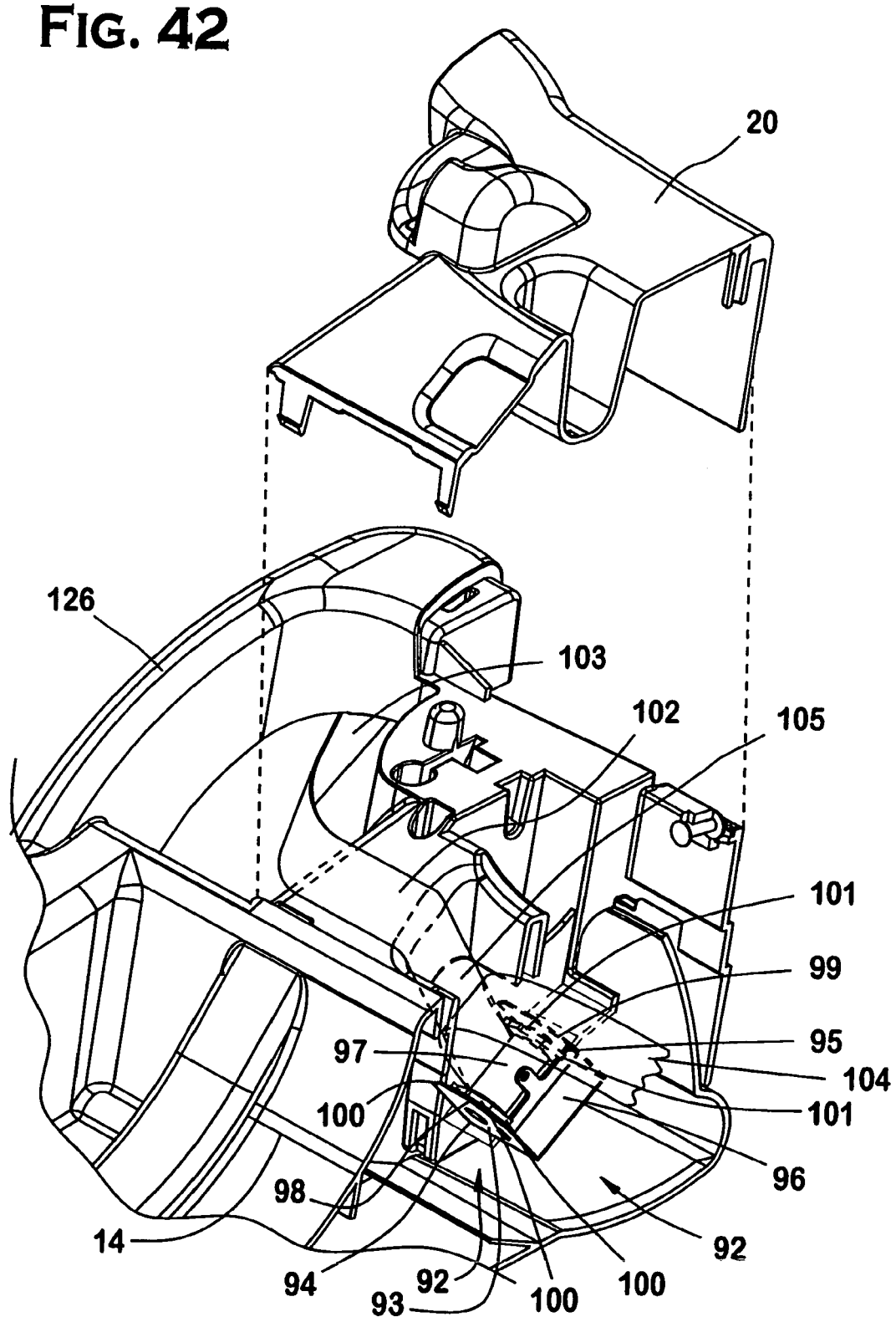
FIG. 42 is a partial cross-sectional view of a second embodiment of the base assembly restraint system with the rear base cover exploded from the base assembly.

FIG. 42 depicts a second embodiment of a self-contained restraint system 91 of the base assembly 12 of the present invention preferably comprising at least one ratcheting retractor assembly 92 secured within the interior of the frame 14. The ratcheting retractor assembly 92 preferably comprises a frame 93 having parallel side walls 94, 95. A bias member or paw 96 is preferably pivotally coupled to the frame 93 between side walls 94 and 95. A spool 97 is rotatably mounted between side walls 94, 95. A pair of ratchet wheels 98, 99, each having a plurality of circumferential teeth 100, 101, are coupled to and rotate with spool 97.

A spring (not shown) is connected to the spool 97 and frame 93 urges the spool 97 to rotate in a slack-reducing or retracting direction to withdraw a tether 102. The tether 102 may but need not be fixedly attached or coupled to the spool 97. The spool 97 is typically urged to move in the retracting direction to retract or withdraw the tether 102 onto the spool 97 in order to reduce the slack in the tether 102. However, the spool 97 is yieldable to allow the tether 102 to be pulled away from the frame 93 in a direction opposite the slack-reducing or retracting direction.

Bias member 96 is coupled to frame 93 such as to be urged against the ratchet wheels 98, 99 in order to engage a pair of opposed teeth 100, 101. The bias member 96 and ratchet wheels 98, 99 operate to prevent rotation of the spool 97 in a direction opposite the slack-reducing or retracting direction. Bias member 96 can be connected to a manual actuator to allow a user to disengage the contact between the bias member 96 and the teeth 100, 101 of the ratchet wheels 98, 99 to allow a user to pull the tether 102 away from the frame 93 in a direction opposite the slack-reducing or retracting direction.

As shown in FIG. 42, the frame 93 is adapted to be mounted within the interior of the frame 14 of base assembly 12. The tether 102 preferably has a first 103 and second end 104 and a central portion 105. The central portion 105 of the tether 102 is received within the interior of the frame 14 and is wrapped around spool 97 when the tether 102 is retracted. The tether 102 from the interior to the exterior of the frame 14 through side slots 80, 82 formed between the upper base cover 16 and the rear base cover 20 and are preferably coupled to a latching mechanism in a similar manner as the divergent ends 68, 70 of the Y-shaped strap member 66 discussed above with respect to the first embodiment of the restraint system 34.

Figure 2:
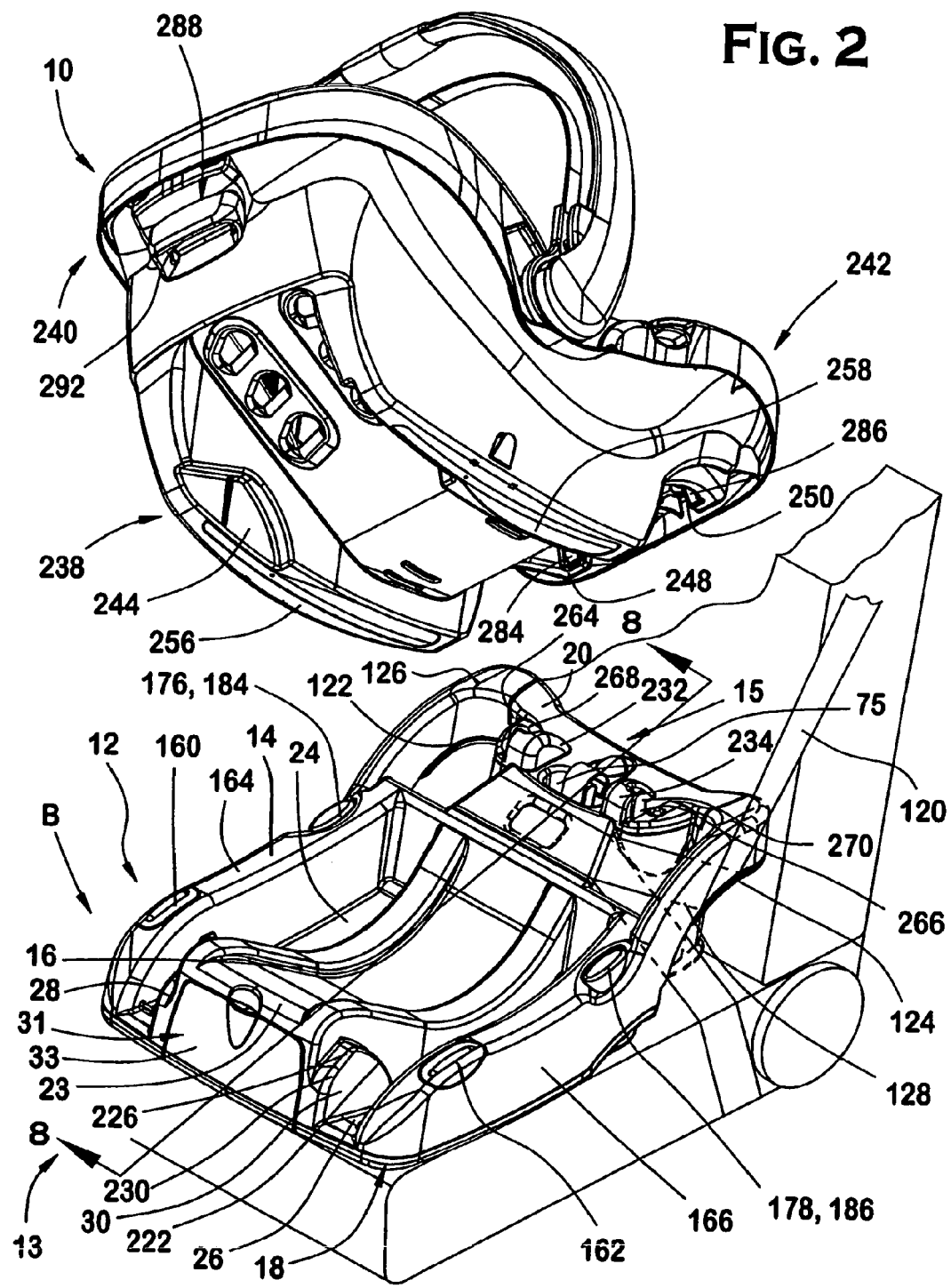
FIG. 2 is an exploded view of the infant travel seat of FIG. 1 in the direction of arrow A in FIG. 1.

As shown in FIGS. 2, 5, and 6, the base 12 can also be secured to a vehicle having a shoulder harness 120 by one of two opposing belt lockoff members 122, 124. As illustrated, the upper base 16 cover has a pair of opposed arm extensions 126, 128 connected to the rear base cover 20. The opposed arm extensions 126, 128 and rear base cover 20 define opposed apertures 130, 132 in the frame 14 at the rear end 15 of the frame 14. The belt lockoff members 122, 124 are each preferably positioned beneath one of the opposed arm extensions 126, 128 of the upper base cover 16 and are secured thereto. FIGS. 5 and 6 illustrate the interaction between one of the belt lockoff member 124 and one of the opposed arm extensions 128 for exemplary purposes, however, it is preferred that both belt lockoff members and arm extensions are identical. Each of the opposed arm extensions 126, 128 includes an interior and an exterior side 134, 136 forming a cavity 135 therebetween. Between the interior and exterior sides 134, 136 and extending through the cavity 135 is a central projection 138 that extends a portion of the length of each of the opposed arm extensions 126, 128. Referring to FIG. 6, each belt lockoff member has an upper rough surface 140, and lower smooth surface 12. The upper rough surface 140 preferably has projecting teeth 144, 146 that extend along a portion of the length of the belt lockoff members 122, 124 parallel to the central projection 122 of the opposed arm extensions 126, 128. As shown in FIG. 6, the teeth 144, 146 of the belt lockoff members 122, 124 partially extend into the cavity 135 of the opposed arm extensions 126, 128 and the central projection of the opposed arm extensions extends between a groove 148 formed between the teeth 144, 146 of the belt lockoff members 122, 124.

When the base 12 is secured to a vehicle using the vehicle's safety strap having a shoulder harness 120, one of the opposing belt lockoff members 122, 124 can be used to secure the shoulder harness 120 to the base assembly 12 in order to prevent the shoulder harness 120 from loosening the fit between the base assembly 12 and the vehicle's safety strap. The shoulder harness 120 is abutted by the teeth 144, 146 of the belt lockoff member 122, 124 and the interior and exterior sides 134, 136 and central projection of the arm extension 126, 128 to form a snug fit to prevent the shoulder harness 120 from moving once engaged.

As shown in FIGS. 1-3, 9, and 10, at least one liquid bubble level 160, 162, is located within the frame 14. A portion of the liquid bubble level 160, 162 is preferably received within the frame 14 and positioned in one of two opposed side portions 164, 166 of the upper base cover 16 at the front end 13 of the frame 14. However, the liquid bubble level could be positioned at any suitable location on the frame. Because the base assembly 12, can be installed in either a left or right side of a vehicle or because a user may access one side of the vehicle when using the base assembly 12, liquid bubble levels 160, 162 are preferably located on the opposed side portions 164, 166 of the upper base cover 16 for the convenience of the user. The liquid bubble levels 160, 162 are preferably curvilinearly shaped to match the curvilinear shape of the respective opposed side portions 164, 166.

Figure 8:
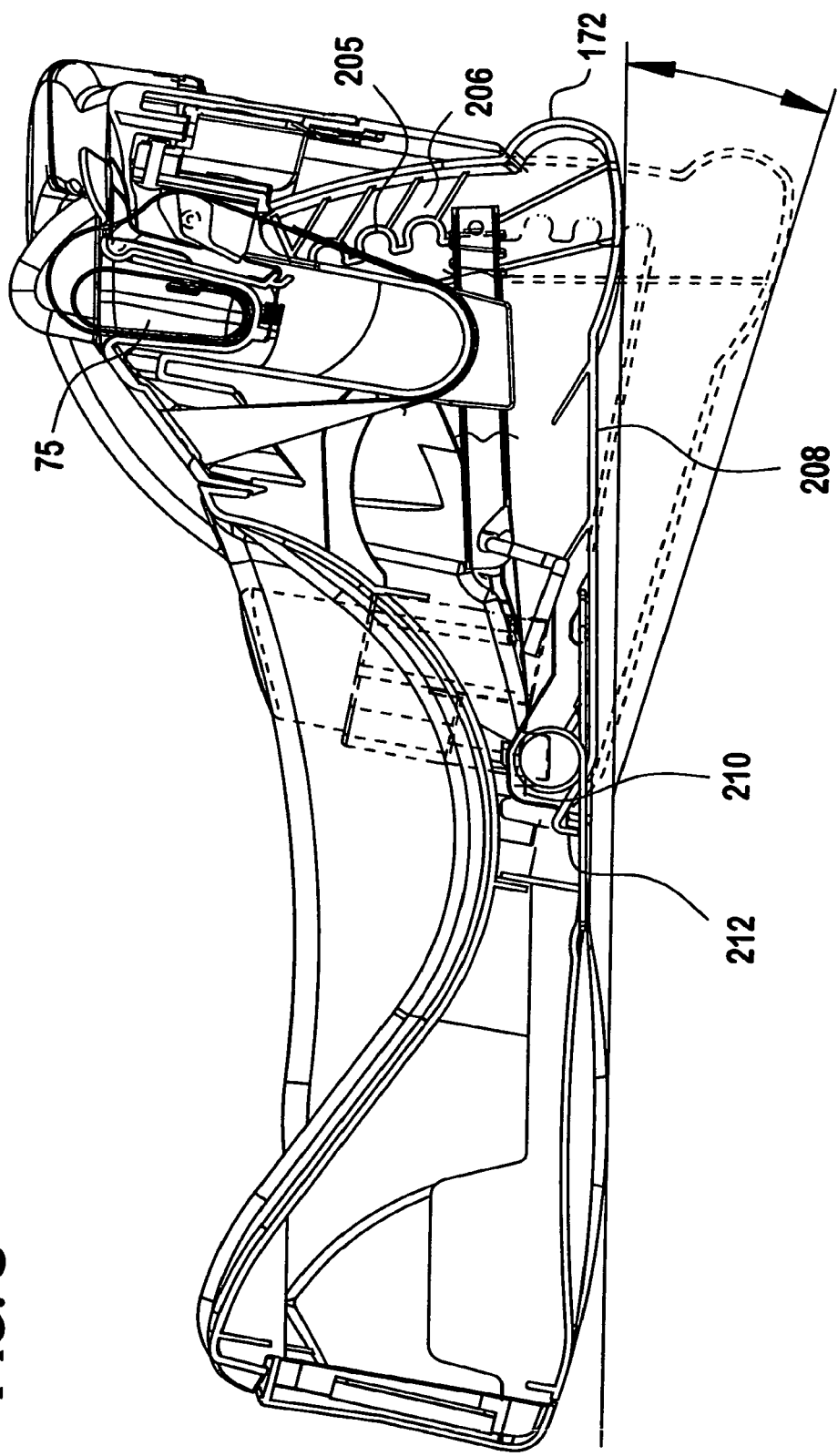
FIG. 8 is a cross-sectional view of the base, taken along the line 8-8 of FIG. 2 that illustrates repositioning of the foot in phantom.
Figure 9:
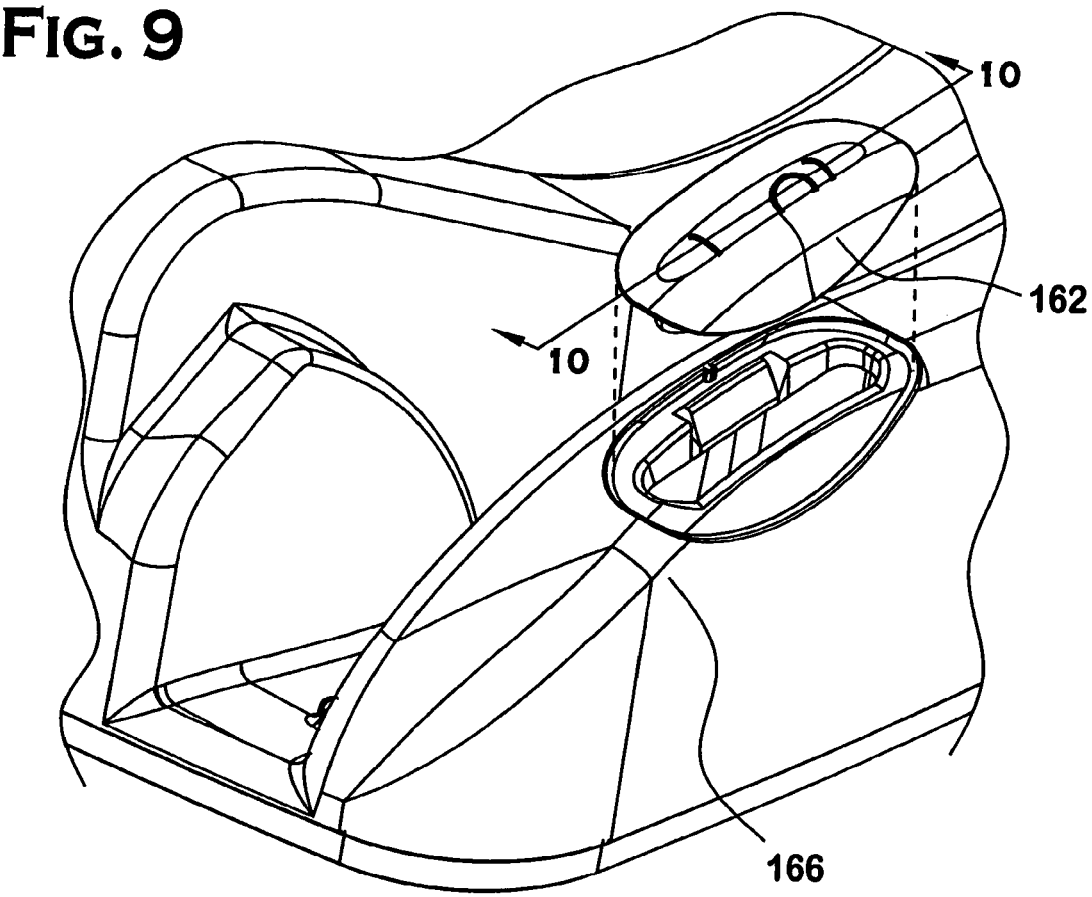
FIG. 9 is a partial view of one of the sides of the base assembly showing a bubble level exploded from the base assembly.
Figure 10:
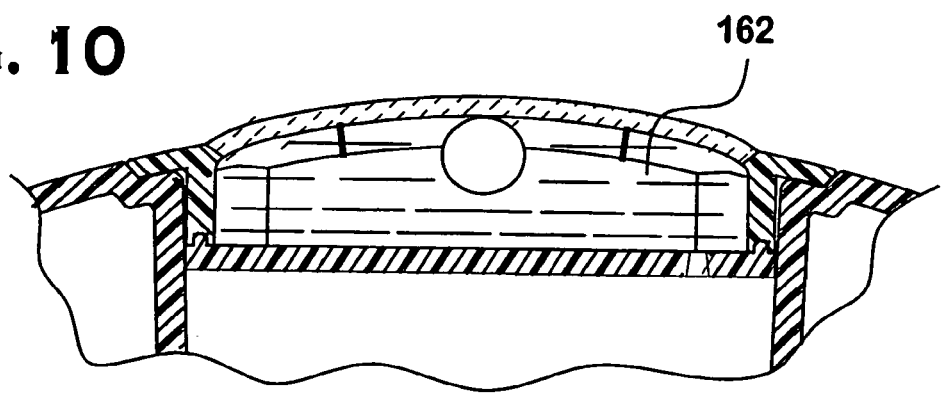
FIG. 10 is a cross-sectional view of the bubble level taken along the line 10-10 in FIG. 9.

Referring to FIGS. 1-5, 7, and 8, a height adjusting assembly 170 of the base 12 is shown. The height adjustment assembly 70 preferably includes an adjustable foot 172 working in cooperation with an adjustment mechanism 174 to raise and lower the adjustable foot 172. The adjustment mechanism 174 includes at least one side recline button, and preferably two opposed side recline buttons 176, 178 received within opposing side apertures 180, 182 on the opposing side portions 164, 166 of the upper base cover 16. The opposed side recline buttons 176, 178 have an upper portion 184, 186 and a lower portion 188, 190. The upper portion 184, 186 of each side recline button 176, 178 is exposed at the upper side of the opposed side portions 164, 166 of the upper base cover 16 for user interface. The lower portion 188, 190 of each side recline button 176, 178 extends into the interior of the frame 14. As shown in FIGS. 7 and 8, the lower side 188, 190 of each opposing side recline button 176, 178 preferably abuts recline bar 192. Recline brackets 194, 196 extend from the recline bar 192 to recline piston rod 198, having first and second ends 197, 199. Springs 200, 202 extend along a portion of each recline bracket 194, 196 to keep each end 197, 199 of the recline piston rod 198 biased against one of a plurality of opposed angled receiving slots 204, 205 extending from an angled portion 206 of the adjustable foot 172.

Still with reference to FIGS. 7 and 8, the adjustable foot 172 includes an angled portion 206 having a plurality of opposed angled receiving slots 204, 205 and a horizontal portion 208 adapted to rest upon a vehicle seat 32 in the same plane as the lower base cover 18. The adjustable foot 172 is pivotally secured to the upper base cover 16 of the frame 14 at a connection end 210 of the foot opposite the angled portion 206. A U-shaped spring 212 is preferably attached to the connection end 210 of the adjustable foot 172 to urge against the upper base cover 16 to bias adjustable foot 172 downwardly.

When at least one of the opposed side recline buttons 176, 178 of the adjustment mechanism 174 are depressed by a user, the recline bar 192 is urged toward the front end 13 of the frame 14, thereby pulling recline brackets 194, 196 and recline piston rod 198 toward the front end 13 of the frame 14. When piston rod 198 is pulled toward the front end 13 of the frame 14, each end 197, 199 of the recline piston rod 198 is sufficiently displaced from the opposed angled receiving slots 204, 205 so as to allow the adjustable foot to pivot in a manner to adjust an angle of the base 12 with respect to the vehicle seat 32. When the foot is re-positioned at a desired angle, the user can release the at least one opposed side recline button 176, 178 causing the each end 197, 198 of the recline piston rod 198 to reengage with one of the plurality of opposed angled receiving slots 204, 205 extending from an angled portion 206 of the adjustable foot 172. The spacing and number of plurality of opposed angled receiving slots 204, 205 is predetermined. At least one of the opposed liquid bubble levels 160, 162 can be used to assist a user in determining a recline position.

The angled portion 206 of the adjustable foot 172 has a substantially vertical orientation with the rear facing portion 17 of the upper base cover 16 and rear facing portion 21 of the rear base cover 20 due to the angled nature of the angled portion 206 and receiving slots 204, 205. The vertical orientation of the base assembly 12 is substantially parallel to the vertical inclination of most vehicle seat backs 87. The adjustable foot 172 can be used to adjust the height of the top of the rear base cover 20 to be approximately from 7 to 10 inches from the bottom of the adjustable foot 172. The vertical nature of the rear end 15 of the base assembly 12 along with the range of height (approximately 7-10 inches) and width of the base assembly 12 (approximately 14 inches) all cooperate to resist the flipping effect associated with infant car seats in rear end collisions. These height and width measurements are used for exemplary purposes, and the height and width of the rear end 15 of the base assembly may vary.

Referring to FIGS. 2 and 12-21, and infant travel seat 10 used in conjunction with the base assembly 12 is shown. FIGS. 2 and 12-14 show the positional arrangement of the base assembly 12 and infant travel seat 12 is shown. The frame 14 of the base assembly 14 includes a curved platform 22 positioned between opposing side channels 24, 26. Two angled guide extensions 28, 30 extend from the curved platform 22 at the rear end 15 of the frame 12. The angled guide extensions 28, 30 each preferably have a curved surface 220, 222 facing toward end 15 of the frame 14, an angled surface 224, 226, and a vertical surface 228, 230. In addition, base cover 16 of the frame 14 further includes two opposed rear guide extensions 232, 234.

Figure 12:
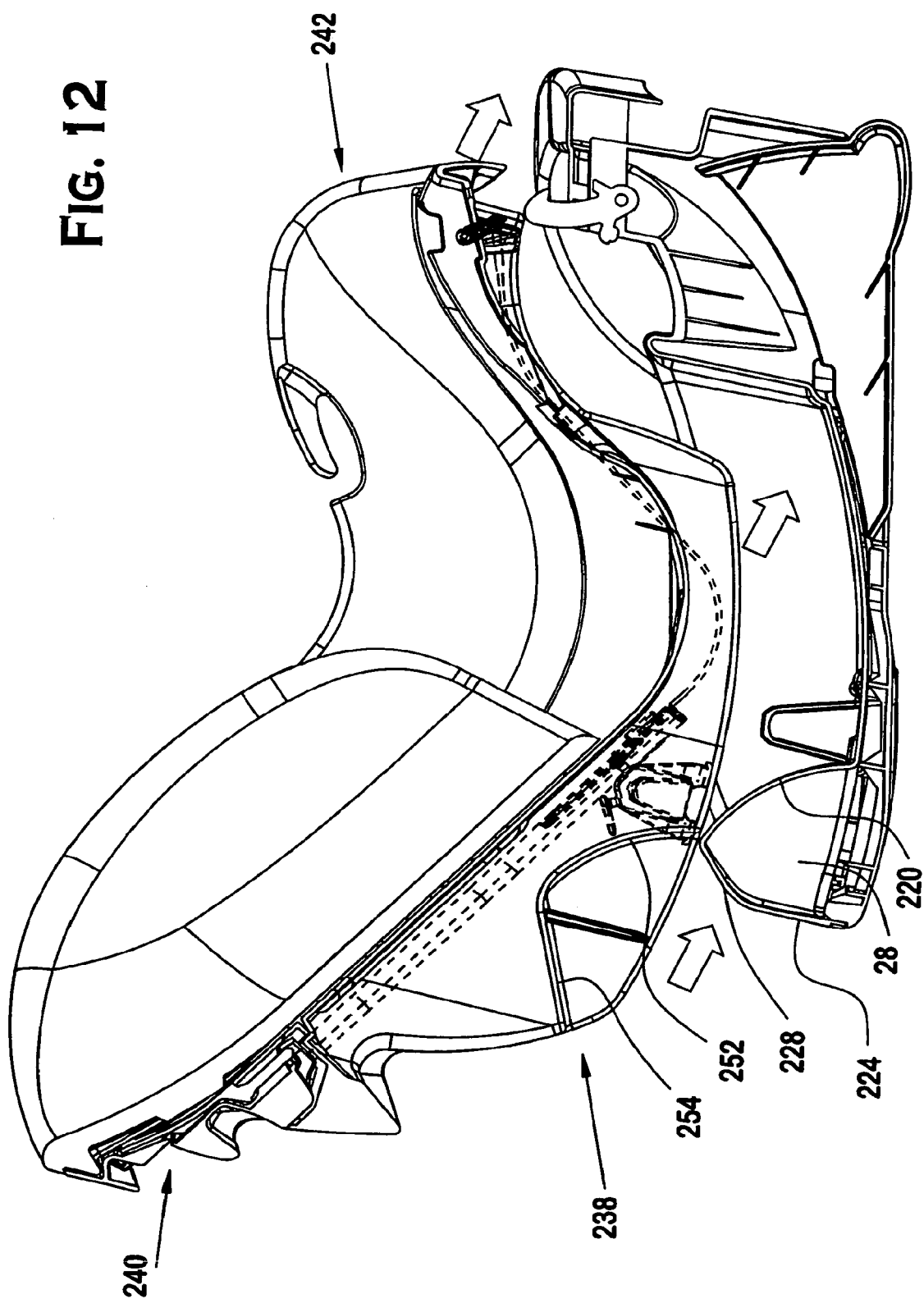
FIG. 12 illustrates the orientation of engagement between the infant travel seat and base assembly of FIG. 1.
Figure 13:
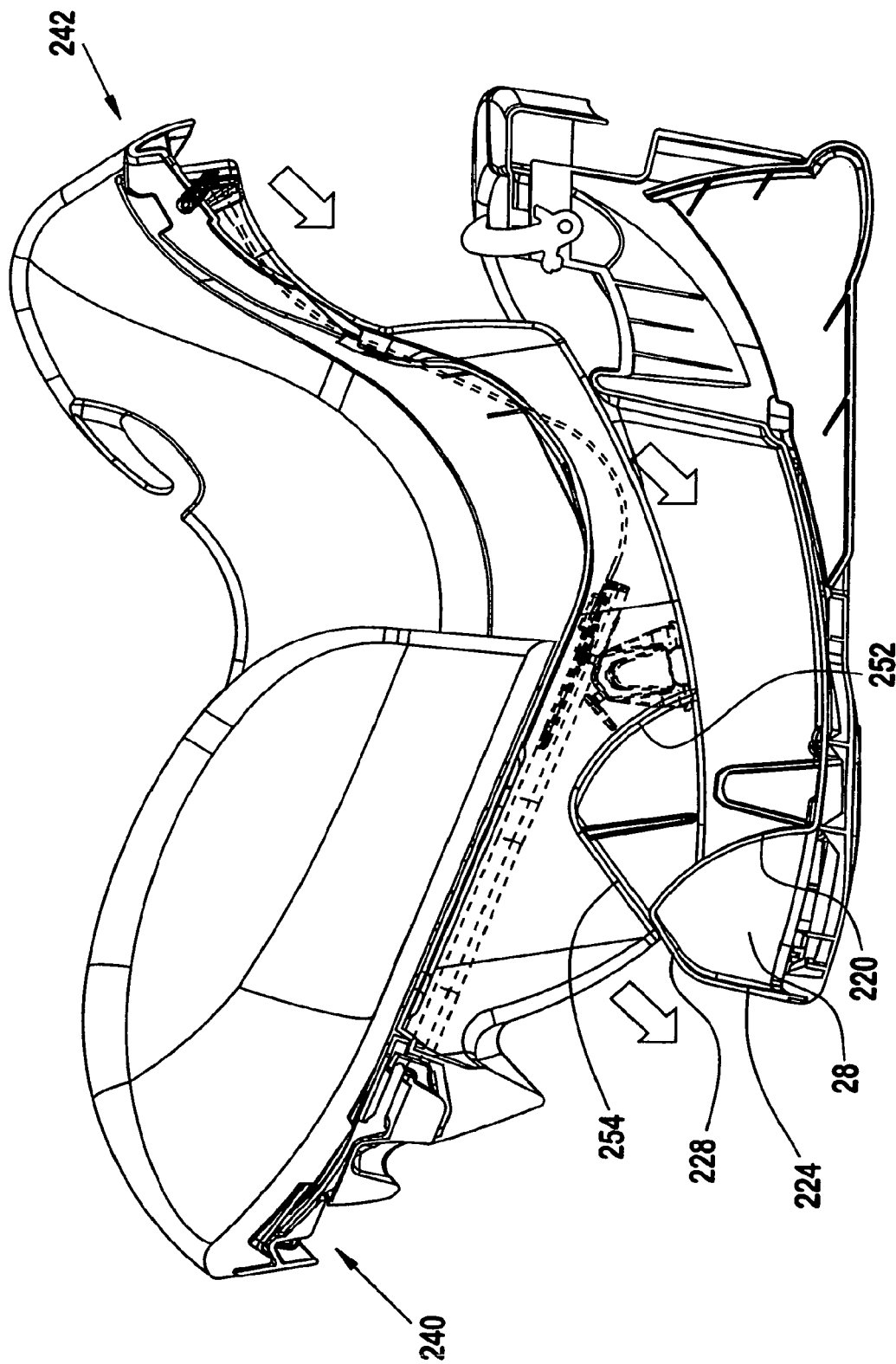
FIG. 13 illustrates the orientation of engagement between the infant travel seat and base assembly of FIG. 1.
Figure 14:
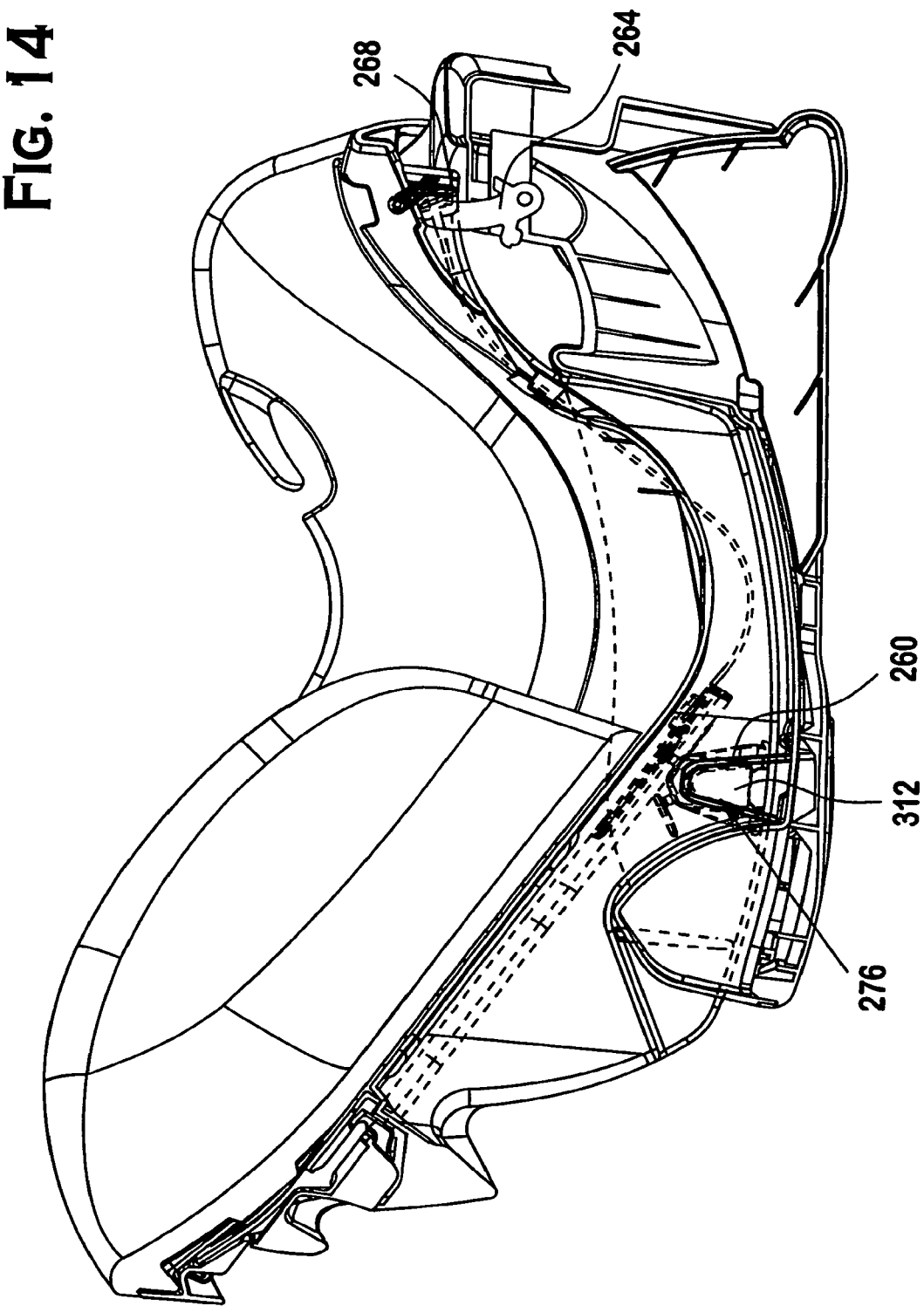
FIG. 14 illustrates the infant travel seat engaged to the base assembly.
Figure 15:
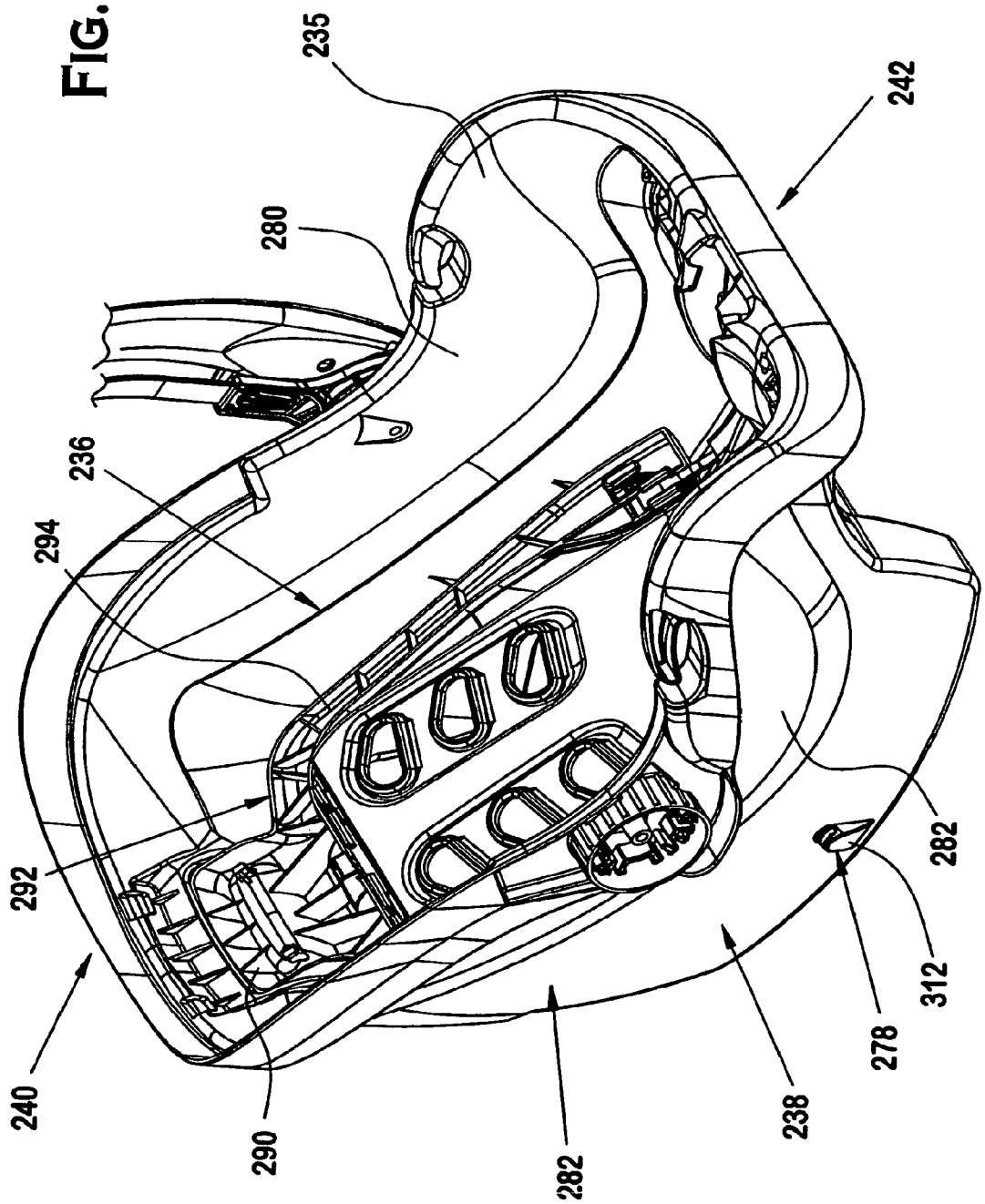
FIG. 15 is a perspective view of the infant travel seat shell with an actuator assembly and carrying handle according to the invention.

With reference to FIG. 15, the infant travel seat 10 includes a shell 235 having an interior side 236 an exterior side 238, a head end 240 and a foot end 242. The exterior side 238 of the shell 235 preferably includes a pair of opposed rails 256, 258 and a pair of opposed grooves 244, 246 to mate with the angled guiding extensions 28, 30 of the base assembly 12, and a pair of opposed grooves 248, 250 at the foot end 42 to mate with the rear guide extensions of the base assembly 12. As illustrated in FIGS. 12 and 13, each of the opposed grooves 244, 246 (only one being shown) have an arcuate surface 252 and a generally straight, but angled, surface 254. The seat 10 can be mounted on the base assembly 12 by contacting the curved surface 252 of the opposed grooves 244, 246 with the curved surface 220, 222 of the angled guiding extensions 28, 30 of the base assembly 12 and pushing the seat 10 toward end 15 of the base assembly 12 (FIG. 12), or by contacting the angled surface 254 of the opposed side grooves 244, 246 of the seat 10 with the angled surface 224, 226 of the angled guiding extensions 28, 30 of the base 12 and pushing the seat 10 in a direction toward end 13 of the base assembly 12 (FIG. 13). When the seat 10 is mounted to the base assembly 12, the opposed rails 256, 258 of the seat 10 are received within the respective opposed side channel 24, 26 of the base assembly 12 (FIG. 14) and the seat 10 rests upon platform 22 of the base assembly 12 (FIG. 14).

Referring to FIGS. 2, 3, 14-21, the infant travel seat 10 is preferably secured to the base assembly 12 at four engaging points. The opposed side portions 164, 166 of the upper base cover 16 each have an opposed side recess 260, 262 facing a respective one of the opposed side channels 24, 26. In addition, the base assembly 12 includes a pair of pivotable securing latches 264, 266, which can be hooks or any other suitable securing device, positioned at the rear end 15 of the base 12, and preferably extending through a pair of apertures 272, 274 extending through the rear base cover 16. Hooks 264, 266 are preferably positioned so a head 268, 270 of the hook 264, 266 faces the rear end 15 of the base 12 (FIG. 7).

Figure 17:
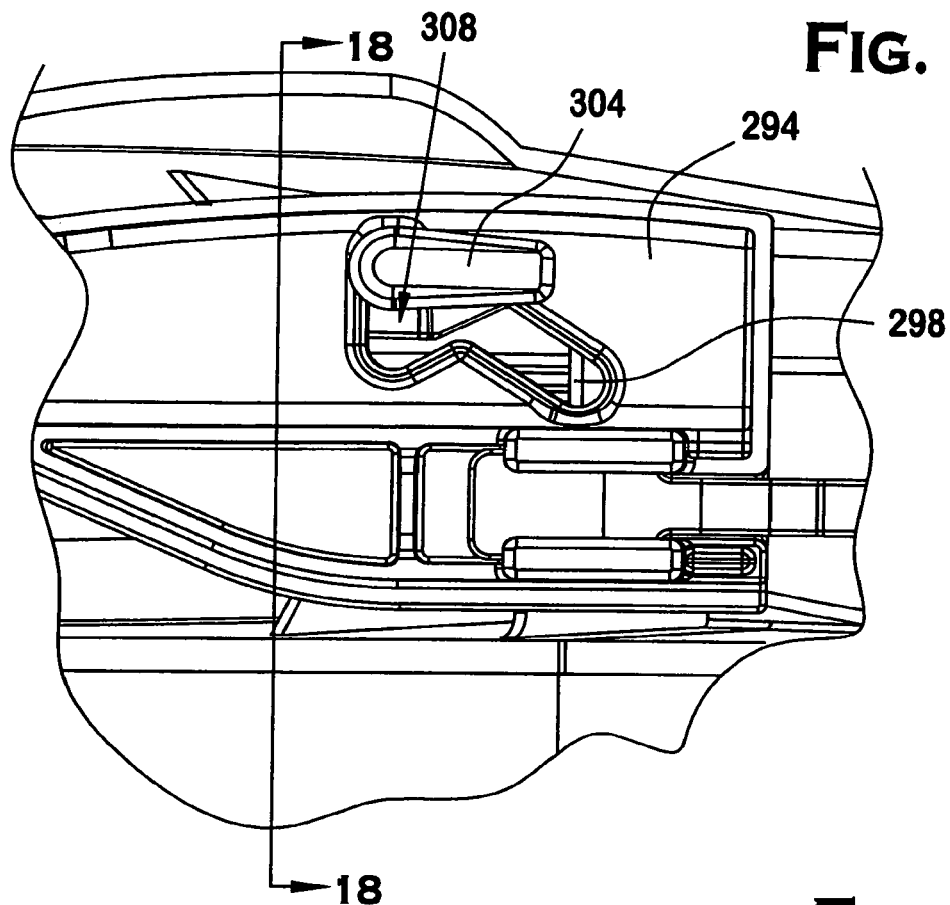
FIG. 17 is a partial view of the infant travel seat shell and actuator assembly showing the area of connection between one of the side flippers and a leg end of the actuator assembly when the actuator assembly is in a resting state.
Figure 18:
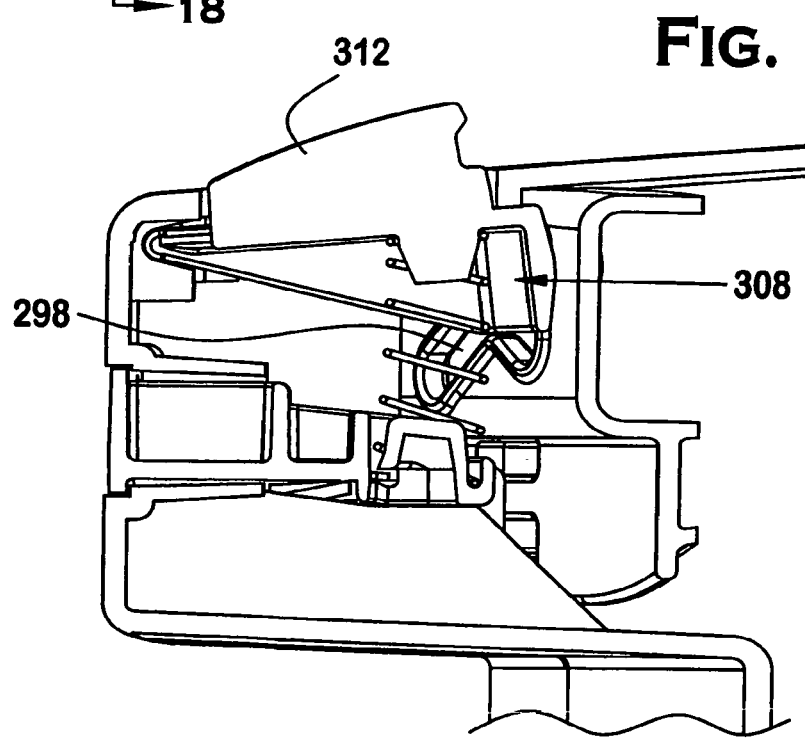
FIG. 18 is a cross-sectional view of the infant travel seat shell and actuator assembly showing the area of connection between one of the side flippers and a leg end of the actuator assembly when the actuator assembly is in the resting state taken along line 18-18 of FIG. 17.

The shell 235 of the seat 10 defines opposed side apertures 276, 278 extending through a side portion 280, 282 of the shell 235. The shell further defines opposed receptacles 284, 286 (FIG. 2) extending through the foot end 242 of the shell 235. The head end 240 of the shell 235 further defines an aperture 288 for receiving a spring-biased handle 290 of an actuator assembly 292 (FIGS. 2, 15). The actuator assembly 292 (FIG. 16) is positioned on the interior side 236 of the shell 235 and the handle 290 of the actuator assembly 292 is accessible through aperture 288. The actuator assembly 292 preferably has two arms 294, 296 extending from the handle 292 down the sides of the interior 236 of the shell 235. The arms preferably have angled slots 298, 300 to receive pins 302, 304 from spring-biased side mounting assemblies 306, 308, respectively. Side mounting assemblies 306, 308 include retractable securing projections 310, 312, such as in the form of a flipper. The retractable securing projections 301, 312 extend from the interior of the shell 235 into side apertures 276, 278. As shown in FIGS. 17 and 18, in a resting state, the spring biased side mounting assemblies 306, 308 bias the retractable securing projections 310, 312 to extend through side apertures 276, 278. The retractable securing projections 310, 312 are adapted to form a complimentary secured engagement with the opposed side recess 260, 262 of the frame 14 of the base assembly 12 when the seat 10 is mounted on the base assembly 12.

Figure 19:
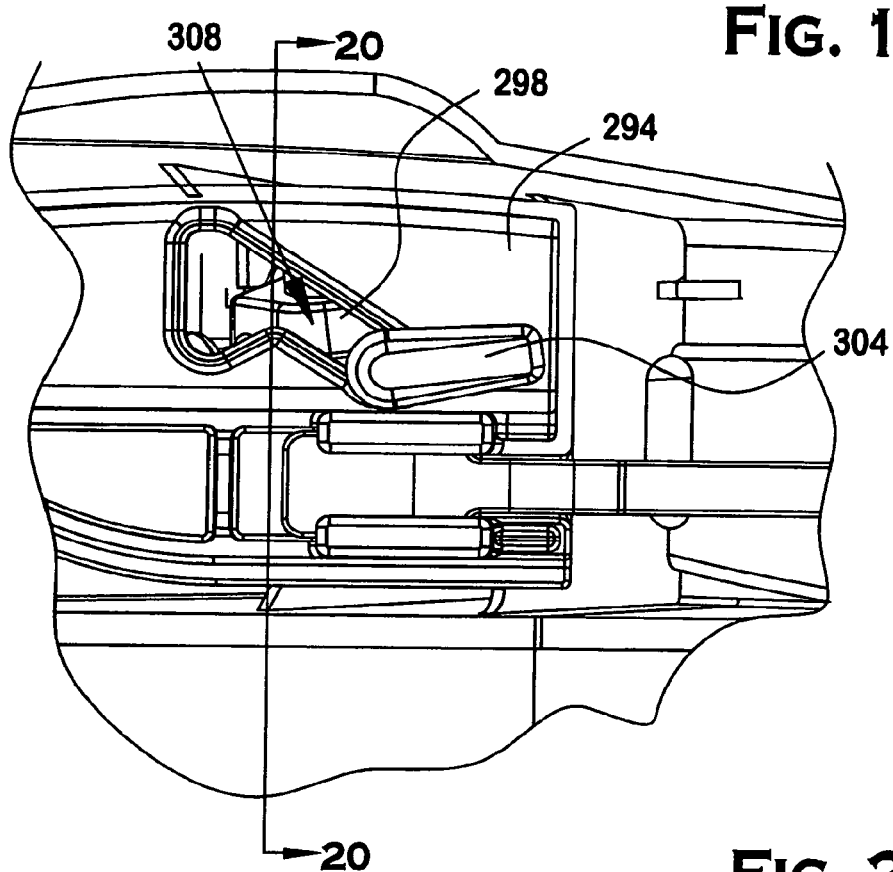
FIG. 19 is a partial view of the infant travel seat shell and actuator assembly showing the area of connection between one of the side flippers and a leg end of the actuator assembly when the actuator assembly is in an activated state.
Figure 20:
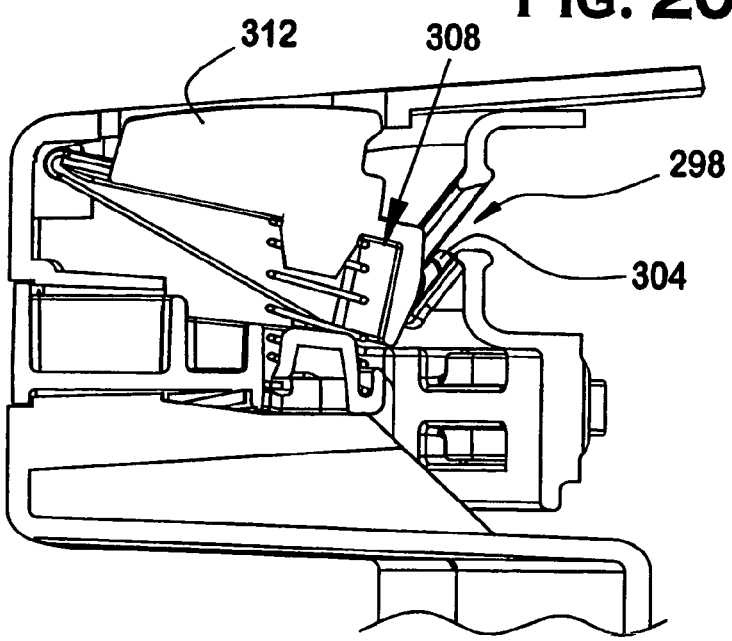
FIG. 20 is a cross-sectional view of the infant travel seat shell and actuator assembly showing the area of connection between one of the side flippers and a leg end of the actuator assembly when the actuator assembly is in the activated state taken along line 20-20 of FIG. 19.

Referring to FIGS. 19 and 20, when the spring-biased handle 290 of the actuator assembly 292 is pulled upwardly, pins 302, 304 of the spring-biased side mounting assemblies 306, 308 slide toward the center of the shell 235 along angled slots 298, 300 causing retractable securing projections 310, 312 to retract toward the interior of the shell 235, thus releasing the secured engagement between the retractable securing projections 310, 312 and the opposed side recess 260, 262 of the frame 14 of the base assembly 12.

Figure 16:
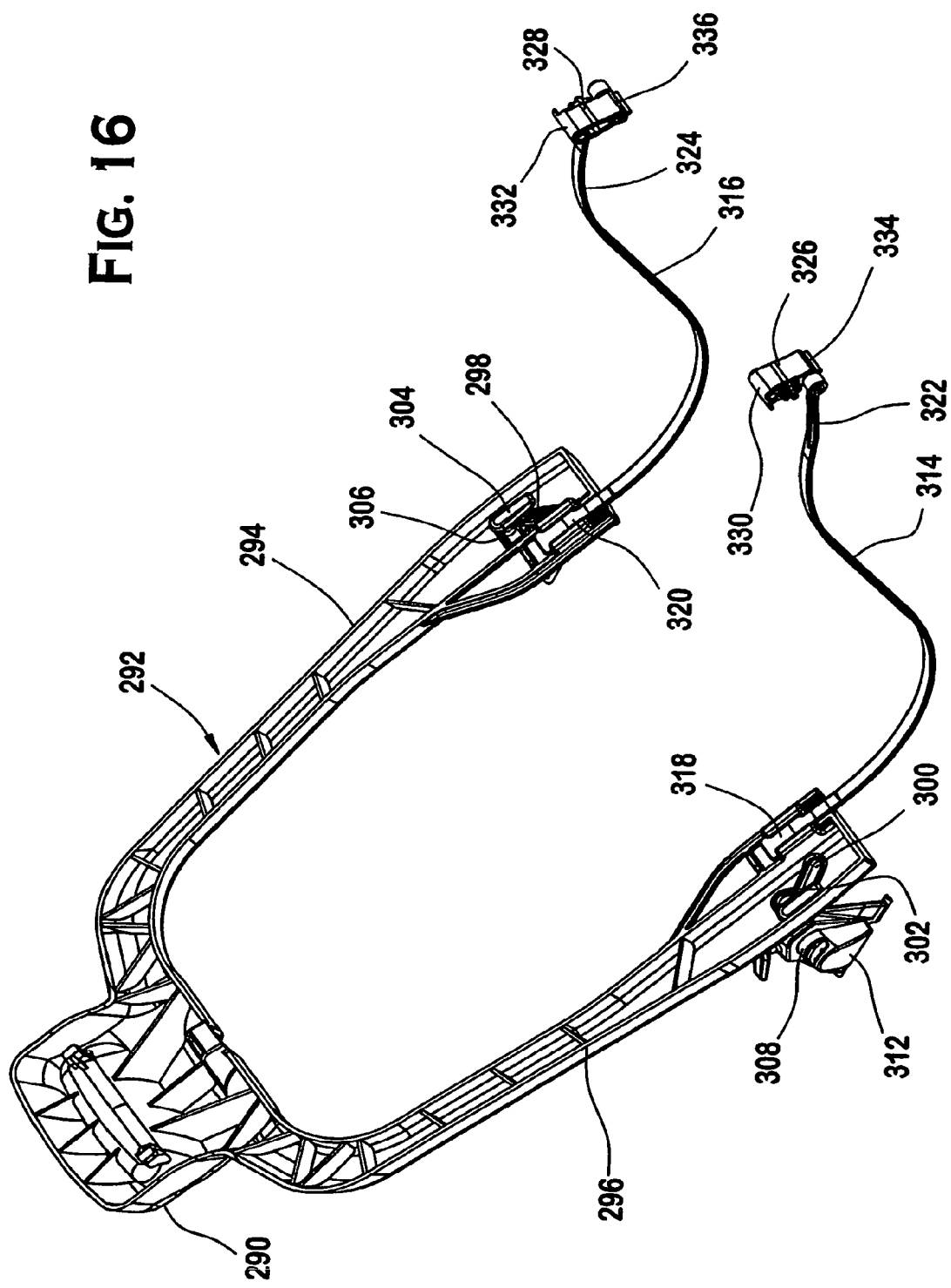
FIG. 16 is a perspective view of the infant travel seat actuator assembly.
Figure 21:
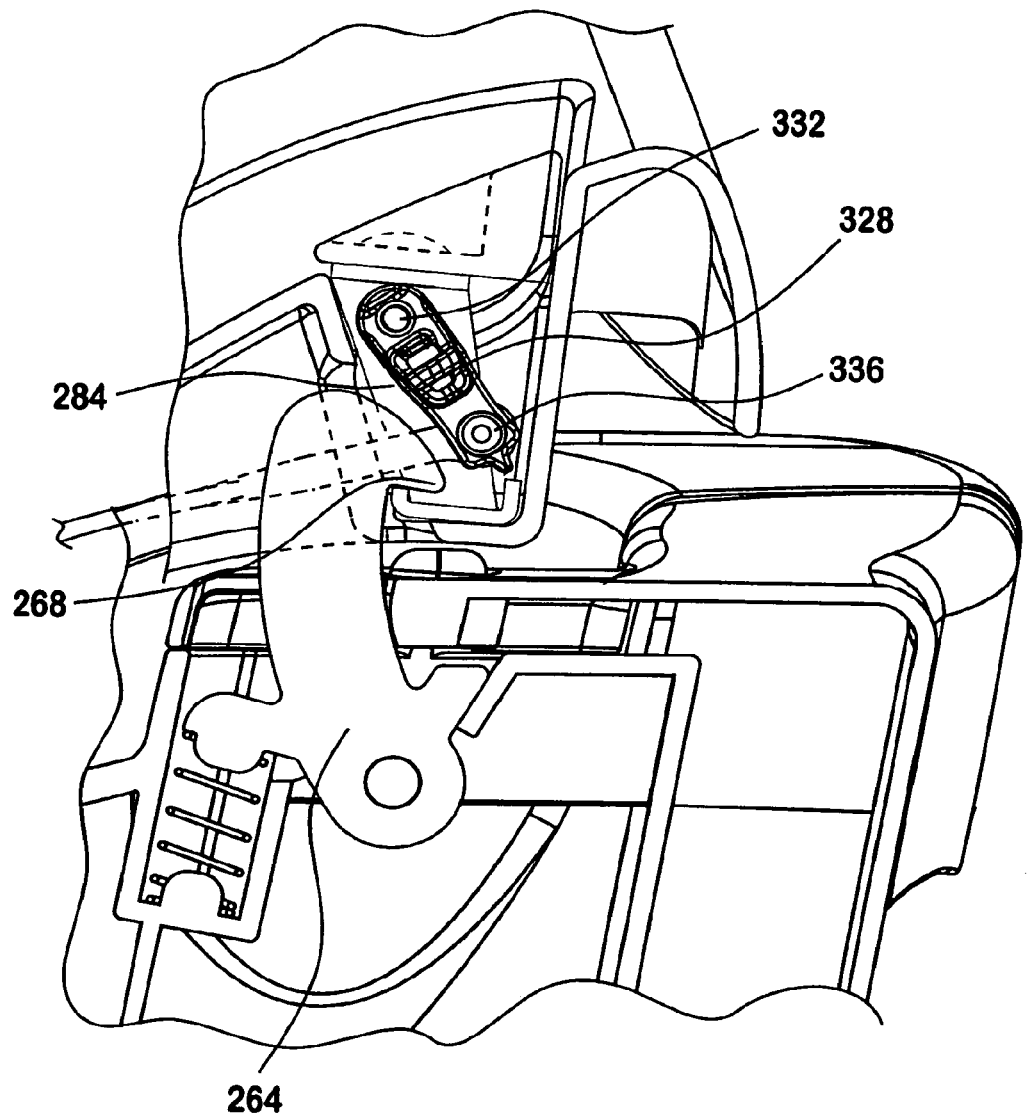
FIG. 21 is a partial cross-sectional view of an attachment mechanism at the upper rear end of the base assembly shown attached to a corresponding receiving mechanism on the infant travel seat.

Referring to FIGS. 15, 16, and 21, and FIG. 16 in particular, the arms 294, 296 of the actuator assembly 292 are each preferably connected to a cable 314, 316, having first 318, 320 and second 322, 324 ends. The first end 318, 320 of each cable 314, 316 being connected to arms 294, 296, and the second end 322, 324 of each cable 314, 316 being connected to biasing members 326, 328, respectively. The biasing members 326, 328 are positioned at and received within the opposed receptacles 284, 286 of the shell 235, respectively. Each biasing members 326, 328 includes a first end 330, 332 and second end 334, 336 end. The first ends 330, 332 of the biasing members 326, 328 are pivotally connected to the shell 335, and the second ends 334, 336 of the biasing members 326, 328 are coupled to cables 314, 316 of actuator assembly 292. The biasing members 326, 328 are biased toward the foot end 242 of the shell 235 in a resting state. The opposed receptacles 284, 286 of the shell 235 are configured to receive the opposed securing latches or hooks 264, 266 of the base assembly 12 when the seat 10 is mounted on the base assembly 12. The engagement of the securing latches or hooks 264, 266 of the base assembly 12 to the receptacles 284, 286 of the seat 10 prevents the seat 10 from rotating or moving upwardly.

Referring to FIG. 21, when the spring-biased handle 290 of the actuator assembly 292 is pulled upwardly, biasing members 326, 328 are pivoted toward the head end 240 of the shell 235 forcing the securing latches or hooks 264, 266 of the base assembly 12 out of receptacles 284, 286, thus releasing the engagement between the securing latches or hooks 264, 266 of the base assembly 12 and the receptacles 284, 286 of the seat 10.

The retractable securing projections 310, 312 of the infant travel seat 10 are adapted to be mounted to a stroller 338 having opposed complimentary receiving slots 339 (only one being shown). A lip 340 on the exterior of the shell 235 proximate to the head end 240 of the shell 235 is adapted to rest on tray 342 of the stroller 338 (see FIG. 41).

Referring to FIG. 32-35, the seat preferably has an infant restraint harness 350, in phantom, made of a webbing material. The vehicle restraint harness is preferably a Y-shaped strap having divergent ends 352, 354 and a central leg end 356. As shown in FIGS. 32-34, a locking mechanism 358 is secured to each of the divergent ends 352, 354 of the Y-shaped strap. The locking mechanism 358 has male and female connectors 360, 362. The female connector 362 has front and back sides 364, 366 defining a groove 368. The front side 364 of the female connector 362 further defines an aperture 370. The male connector 360 has front and back sides 272, 274 and a receiving end 276, the receiving end 276 adapted to be received within the groove 368 of the female connector 362. The front side 272 of the male connector 360 preferable includes a flexible button 378 receivable within the aperture 370 of the female connector 362. When end 376 of the male connector 360 is inserted within the groove 368 of the female connector 362, the flexible button 378 of the male connector 360 is received by the aperture 370 of the female connector 362. To disengage, a user depresses the flexible button 378.

Figure 35:
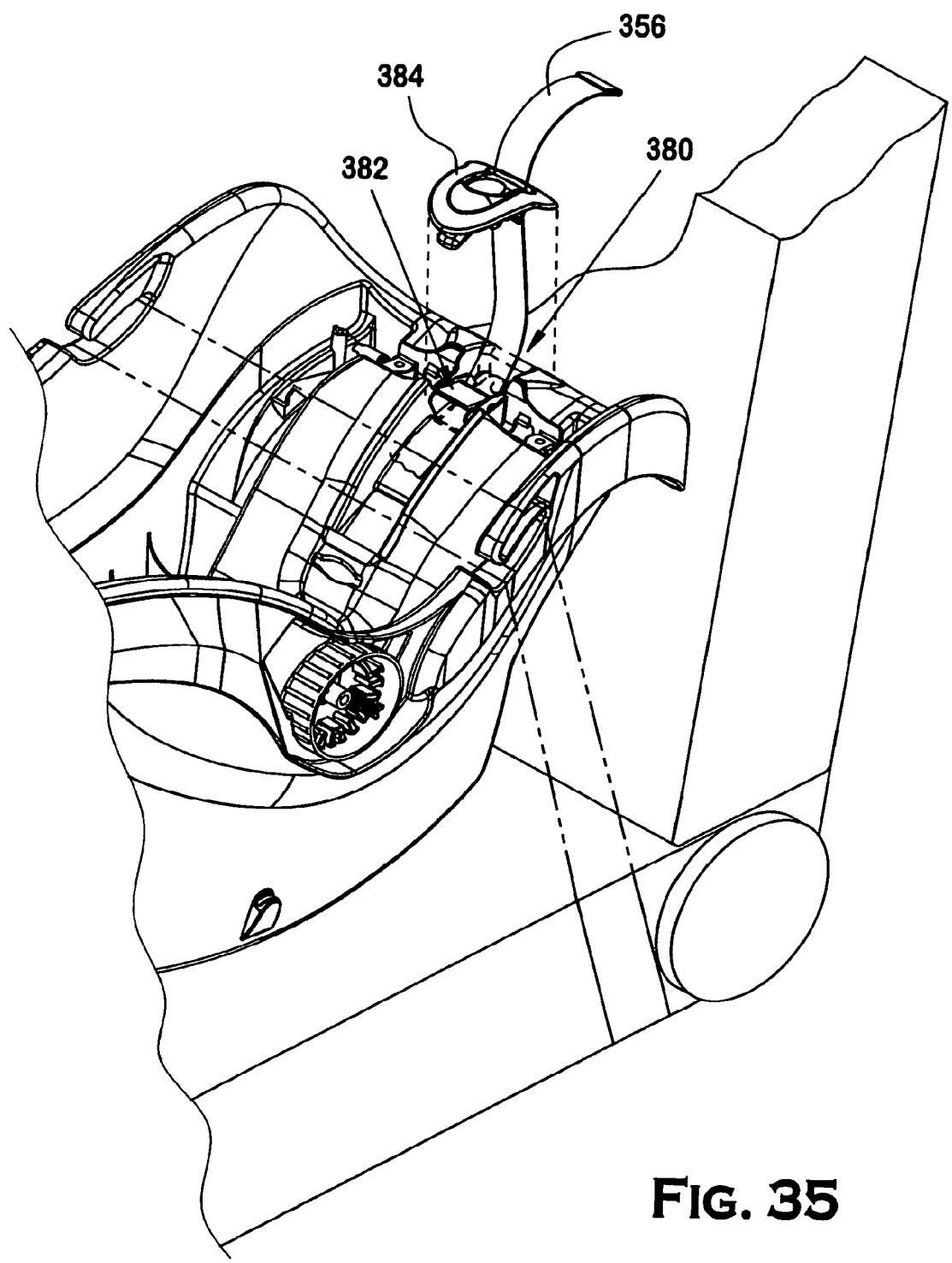
FIG. 35 is an exploded fragment of a child restraint harness adjustment assembly.
Figure 36:
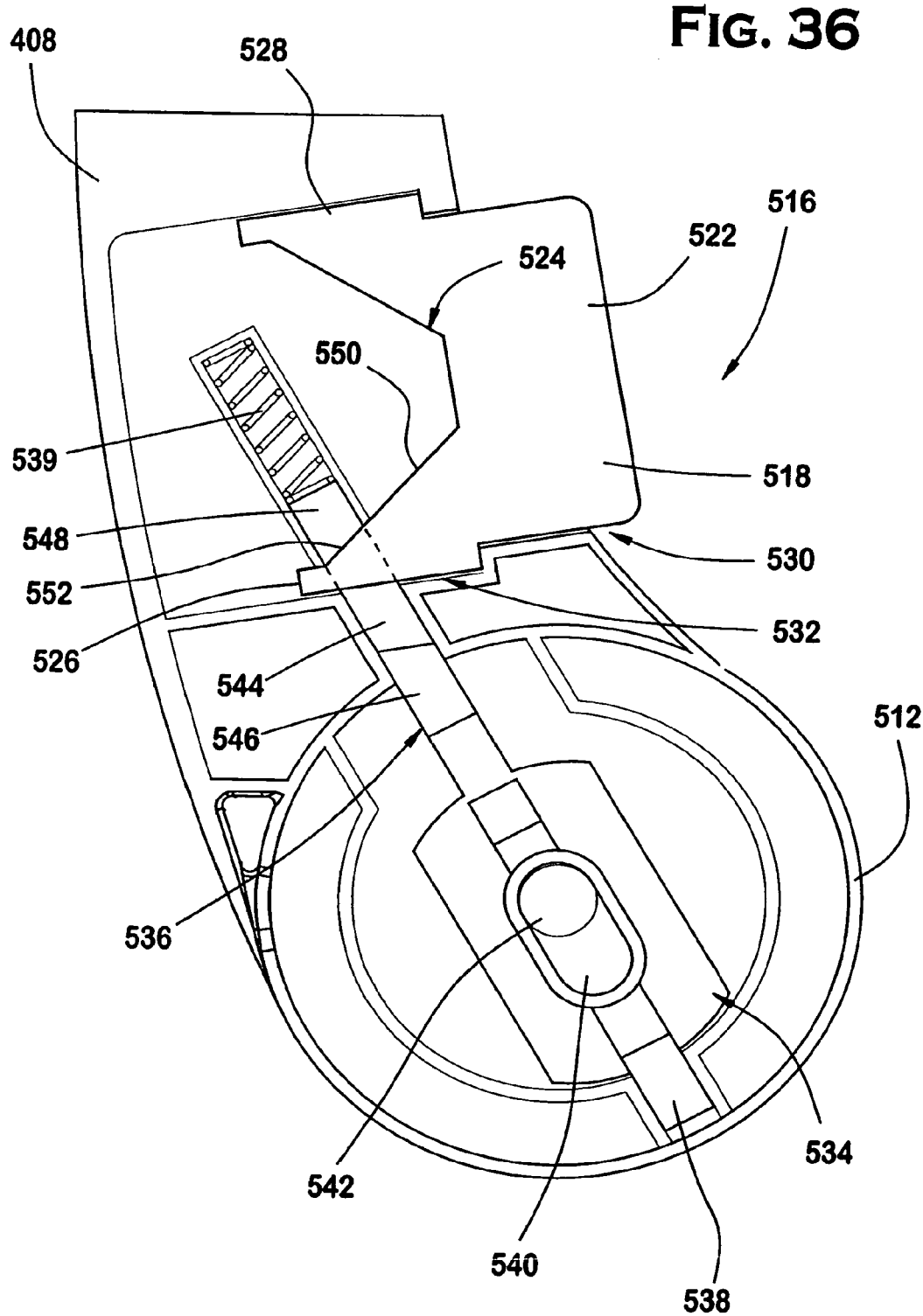
FIGS. 36, 37, 39, and 40 illustrate a second embodiment of the handle attachment assembly and locking member of the infant travel seat carrying handle in various engagement positions.
Figure 37:
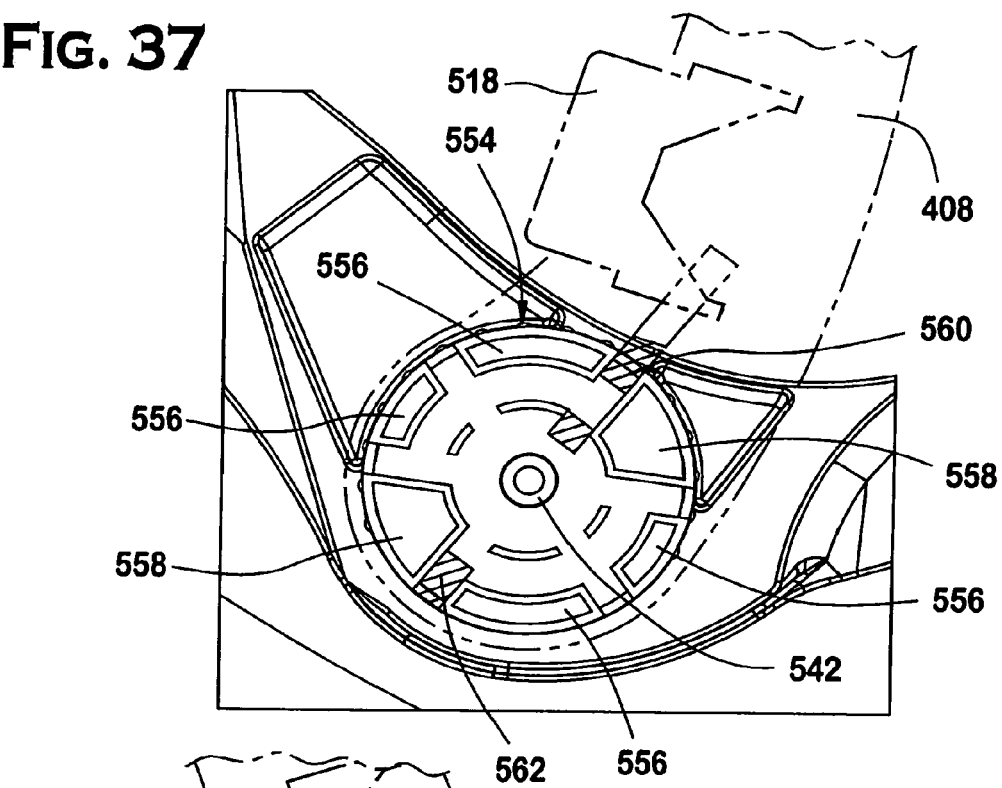
Figure 38:
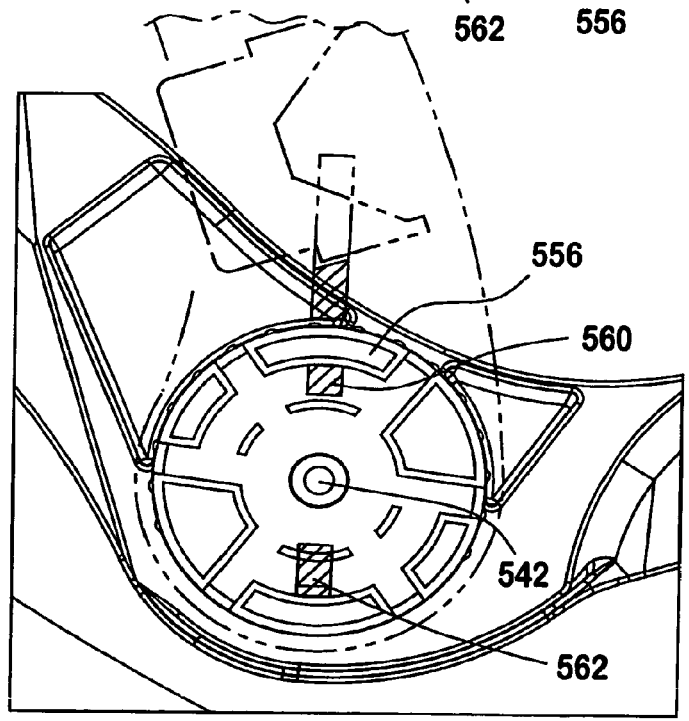
FIG. 38 illustrates a second embodiment of the handle attachment assembly and locking member of the infant travel seat carrying handle in a disengaged position.
Figure 39:
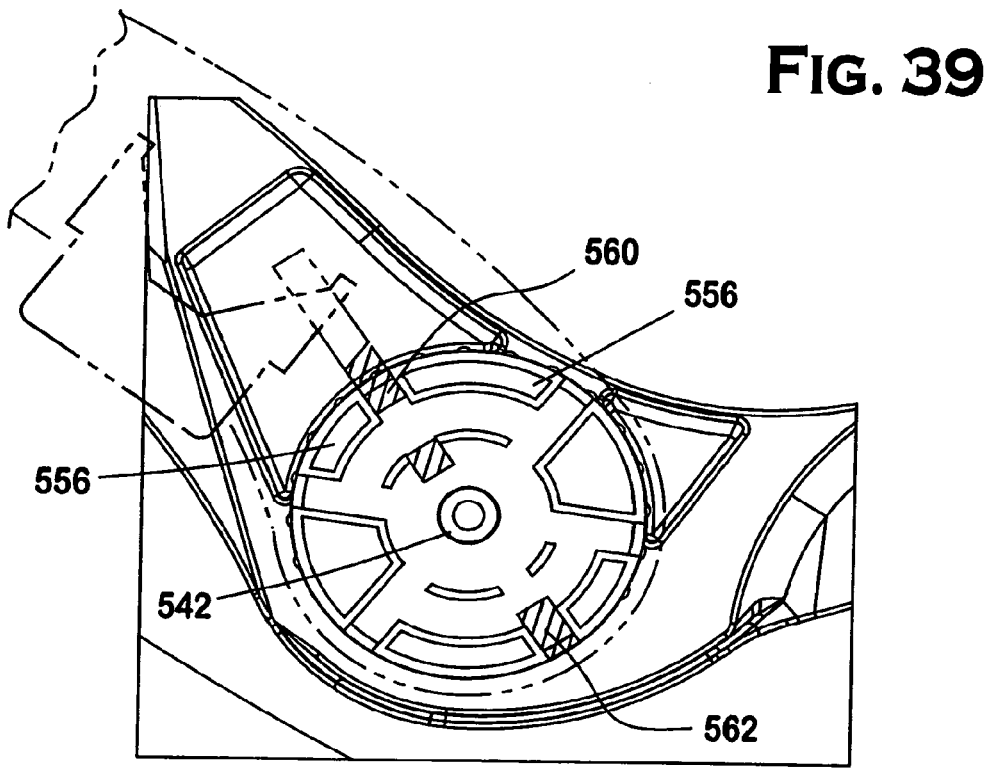
Figure 40:
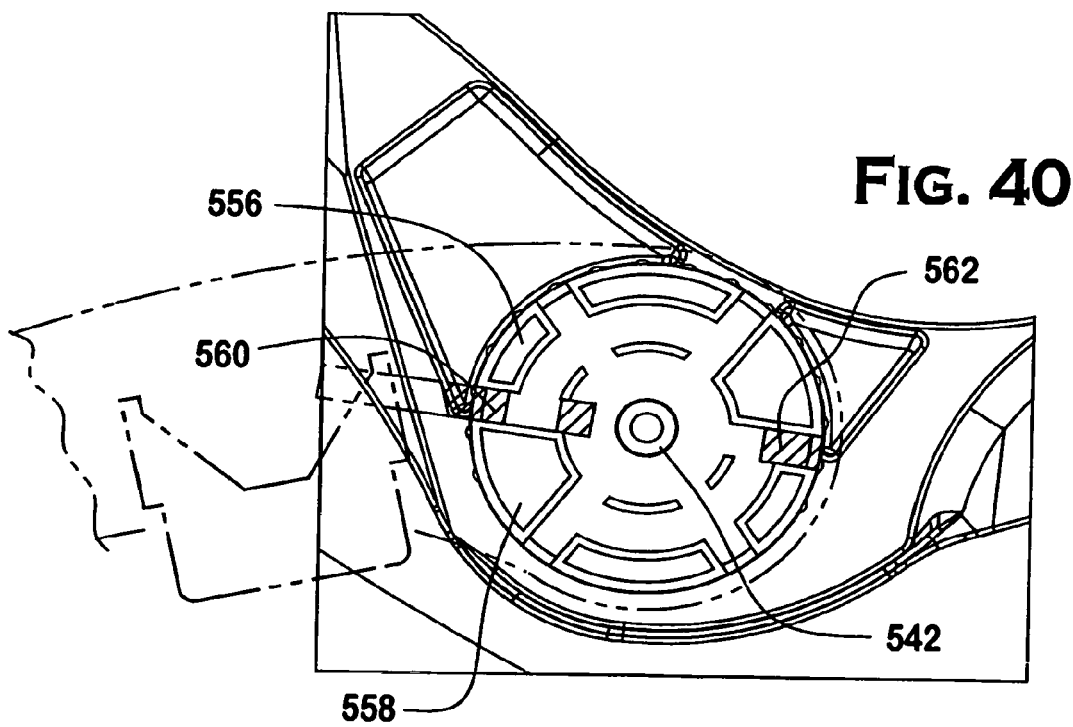
Figure 41:
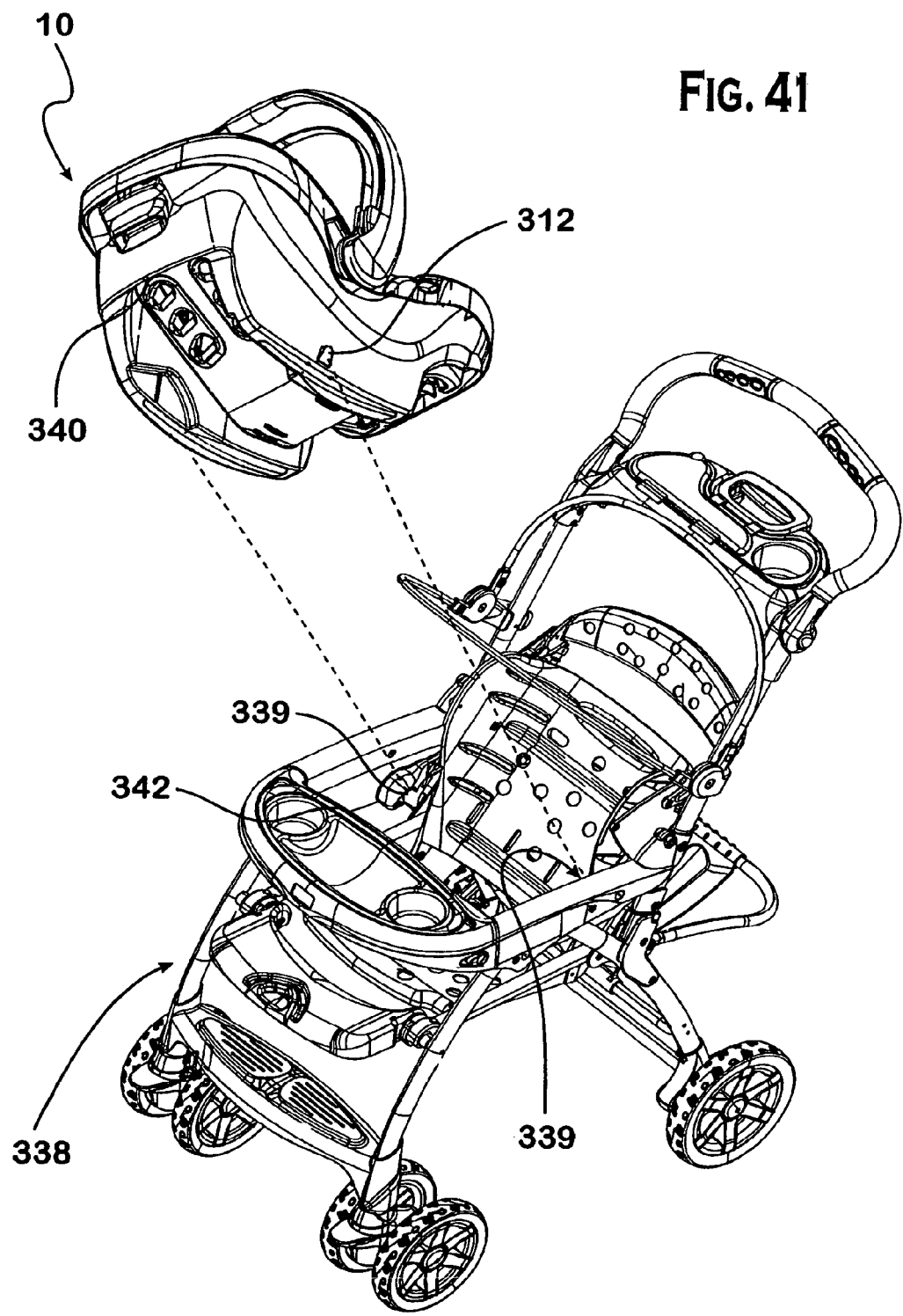
FIG. 41 is a perspective view of the infant travel seat and complimentary stroller engagement assemblies.

Referring to FIG. 35, the seat 10 further includes a harness adjusting assembly 380. The harness adjusting assembly 380 comprises a locking assembly 382 and an adjusting tab 384. The adjustment assembly 380 operates in a similar fashion to the base adjustment assembly 38, described above and incorporated by reference, and is not repeatedly described at length herein.

FIGS. 22-31 illustrate a first embodiment of opposed handle attachment assemblies 400, 402 for securing each arm 406, 408 of a carrying handle 404 to an infant travel seat 10. The handle attachment assemblies 400, 402 preferably include a hub receiving portion 410, 412 of each arm 406, 408 adapted to be secured to opposing side hubs 414, 416 of the shell 235 of the seat 10 (see FIG. 1). Only one of the opposed handle attachment assemblies 400, 402 will be described in detail below, however, both of the attachment assemblies 400, 402 are preferably identical.

Figure 22:
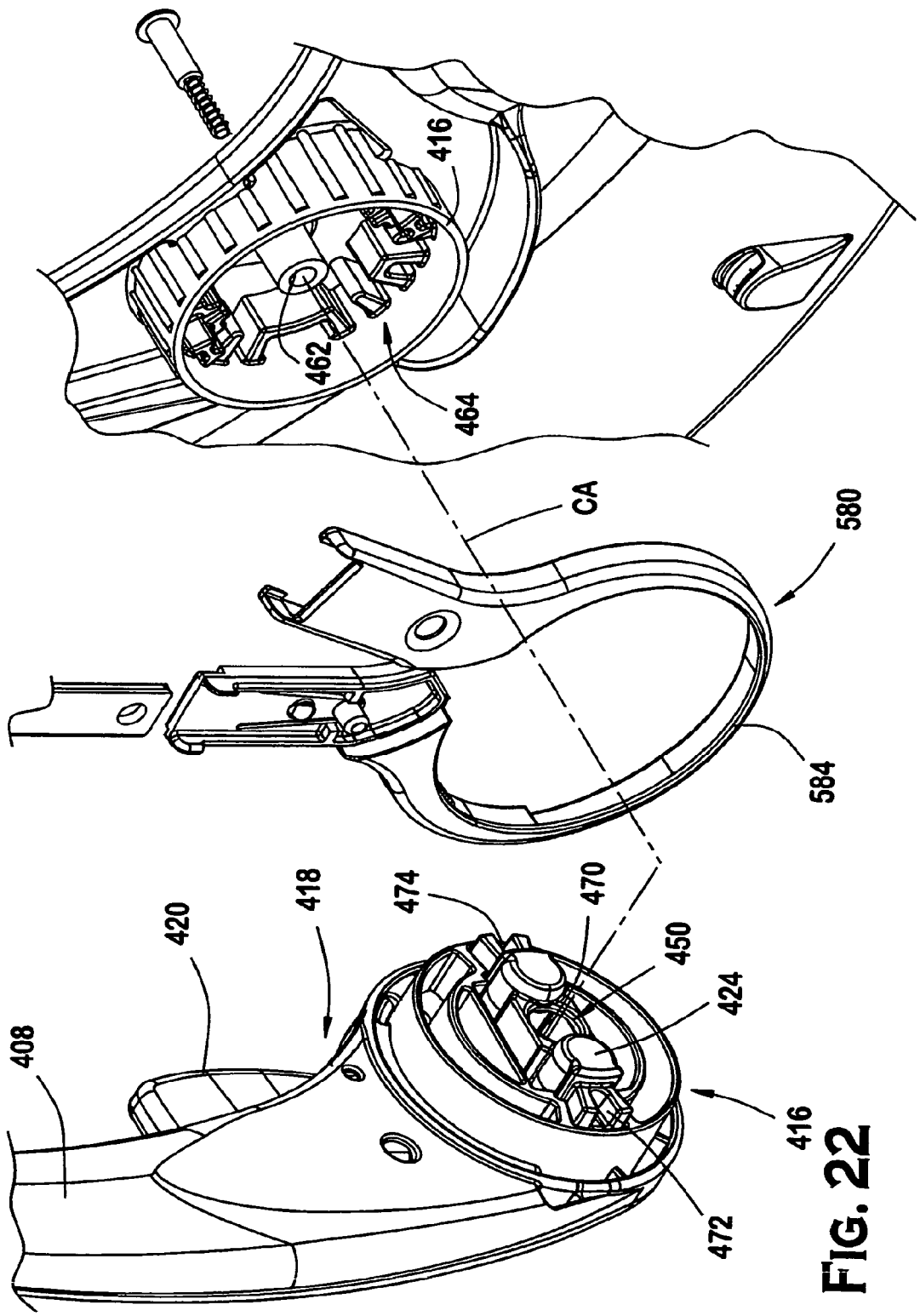
FIG. 22 is an exploded view of a first embodiment of the handle attachment assembly and canopy ring for a canopy frame.
Figure 23:
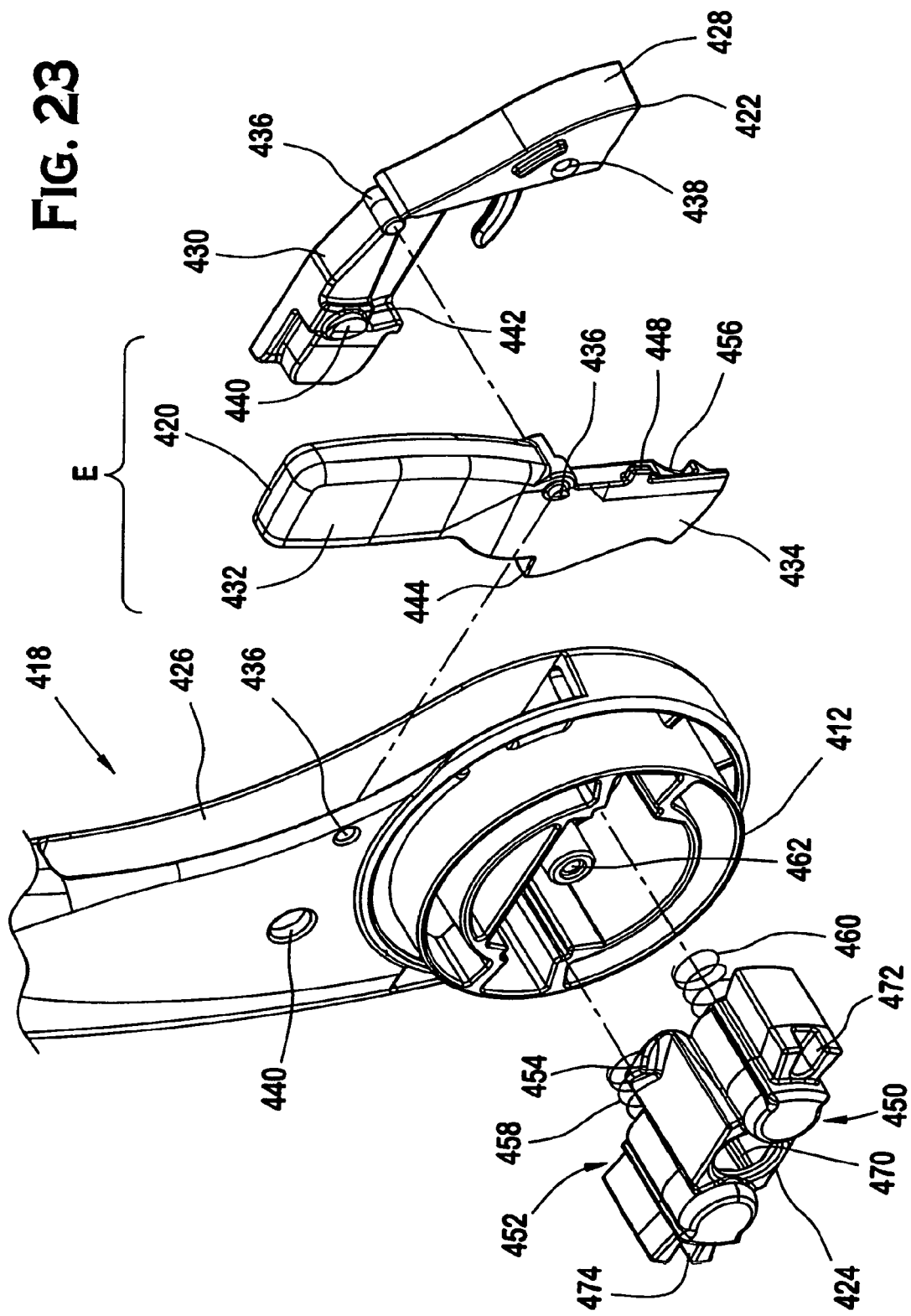
FIG. 23 is an interior view of one element of the carrying handle of FIG. 22.
Figure 24:
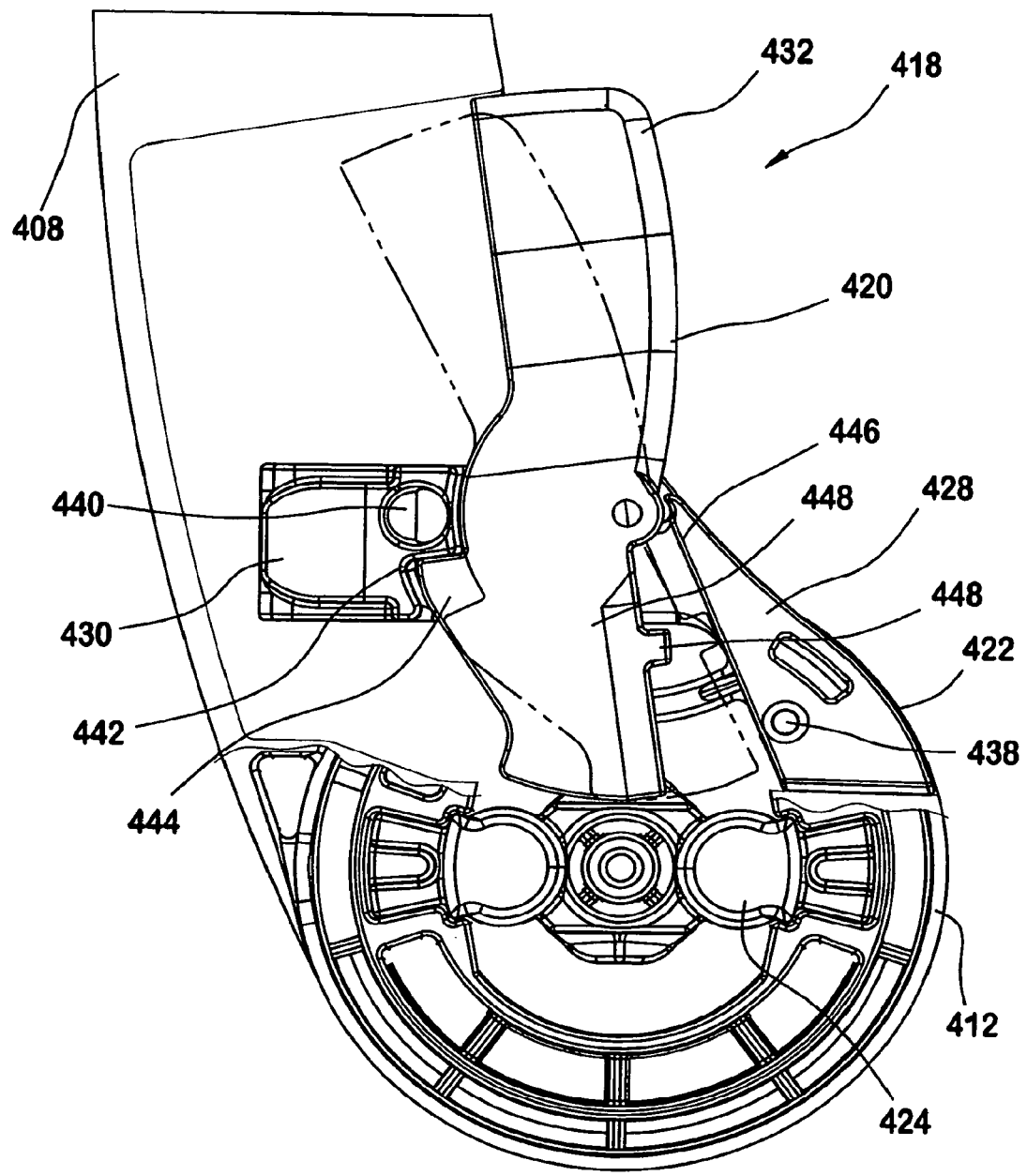
FIG. 24 is an interior view of a first embodiment of the handle attachment of the infant travel seat carrying handle as assembled to illustrate activation of the handle actuator.
Figure 25:
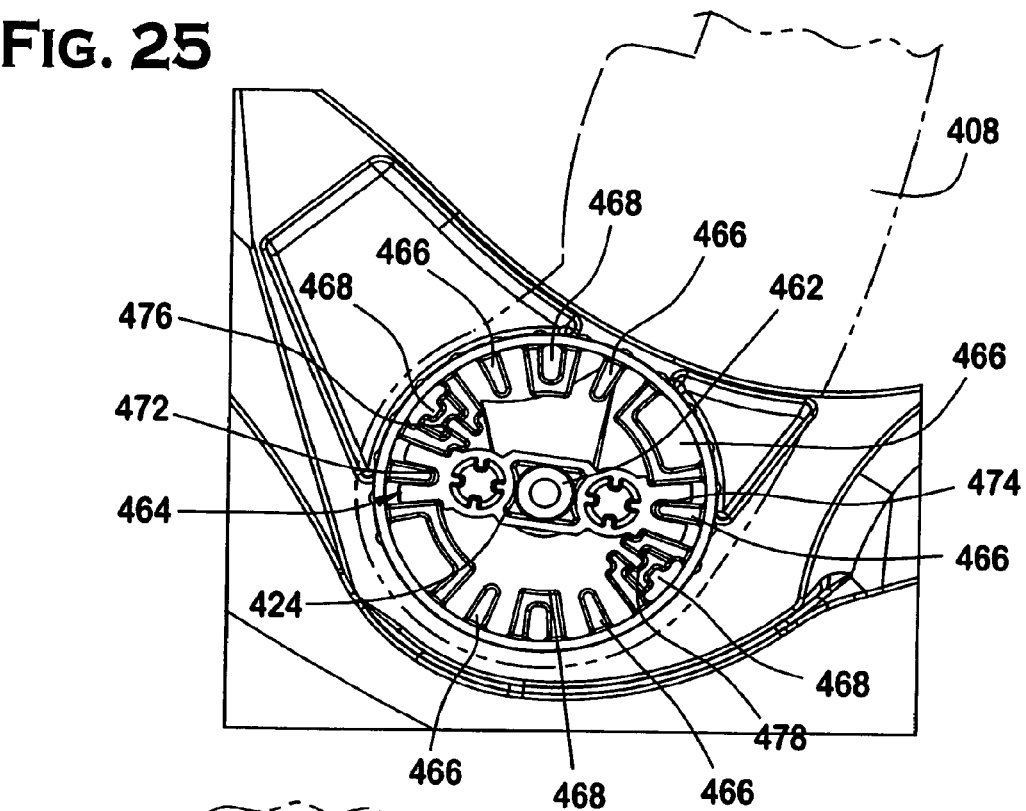
FIGS. 25, 27, and 28 are cross-sectional views illustrating a first embodiment of the handle attachment assembly and locking member in various secured engagement positions.
Figure 26:
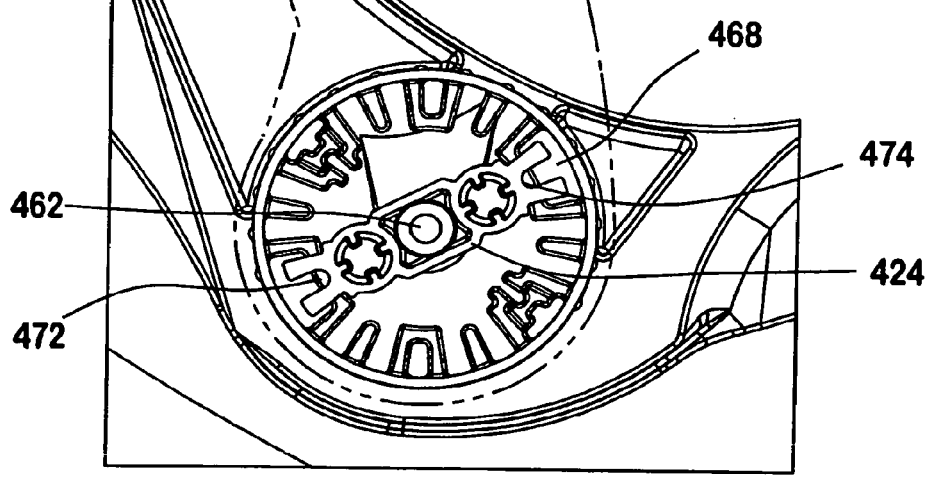
FIG. 26 is a cross-sectional view illustrating a first embodiment of the handle attachment assembly and locking member in a disengaged position.
Figure 27:
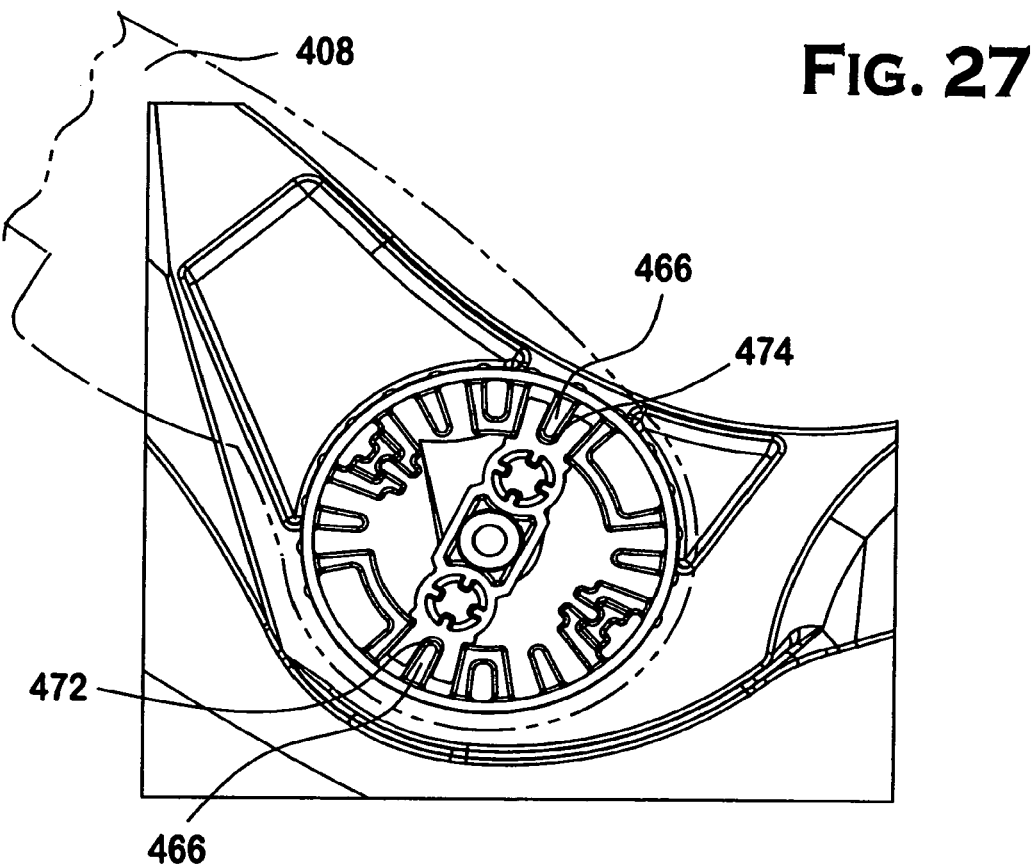
Figure 28:
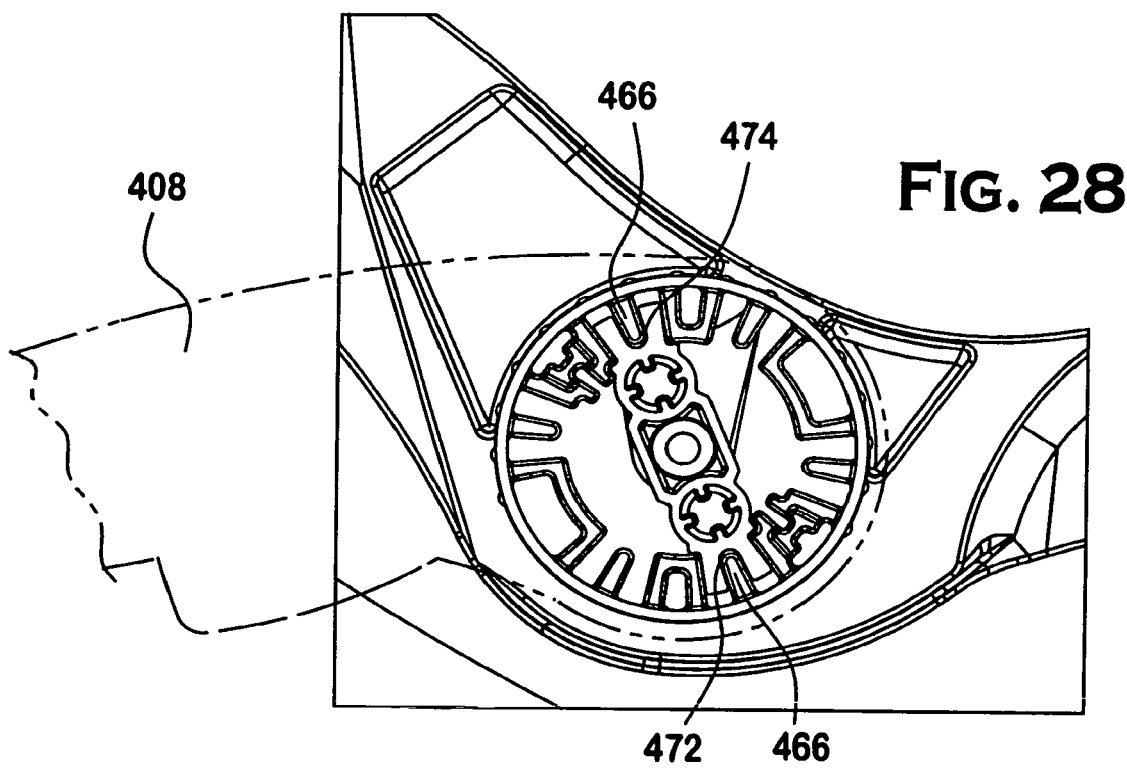

Referring to FIGS. 22-24 and 29-30, the hub receiving portion 412 includes an actuating assembly 418 comprising a pivotable member 420, a stationary member 422, and a spring-biased locking member 424. The arm 408 of the handle 404 defines an aperture 426 proximate to the hub receiving portion 412 for receiving the pivotable member 420 and stationary member 422. The stationary member has a cover end 428 and an interior end 430 received within arm 408. The pivotable member 420 includes a lever end 432 and a biasing end 434 end. The pivoting member 420 is adapted to be pivotally secured to stationary member 422 at pivot point 436 (FIG. 23). Pivotable member 420 and stationary member 422 are received within aperture 426 such that the cover end 428 of the stationary member 422 is substantially flushed with the exterior surface of the arm 408 and lever end 432 of pivotable member extends outwardly through aperture 426. Stationary member 422 is secured to arm 408 at securing points 438, 440 when received in arm 408. Pivotable member 420 is pivotally secured to stationary member 422 and arm 408 at pivot point 436 when received in arm 408. As shown in FIGS. 23 and 24, edge 442 of the stationary member 422 limits the downward rotation of pivotable member 420 by abutting complimentary edge 444, of pivotable member 420. Similarly, the interior surface 446 of the cover end 428 of stationary member 222 limits the upward rotation of pivotable member 420 by abutting projection 448.

Pivotable member 420 preferably extends through aperture 426 such that biasing end 434 is positioned within the hub receiving portion 412. Spring-biased locking member 424 has a first end 450 for engaging a complimentary locking mechanism, and a second end 452 positioned within the hub receiving portion 412 to abut biasing end 434 of the pivotable member 420. The second end 452 of the locking member 424 has an angled cam surface 454 that abuts a complimentary angled cam follower surface on the biasing end 434 of the pivotable member 420. The second end 452 of the locking member 424 also preferably includes a pair of springs 458 460 to bias the locking member 424 away from the hub receiving portion 412 and toward opposed side hub 416 of the shell 235.

Figure 29:
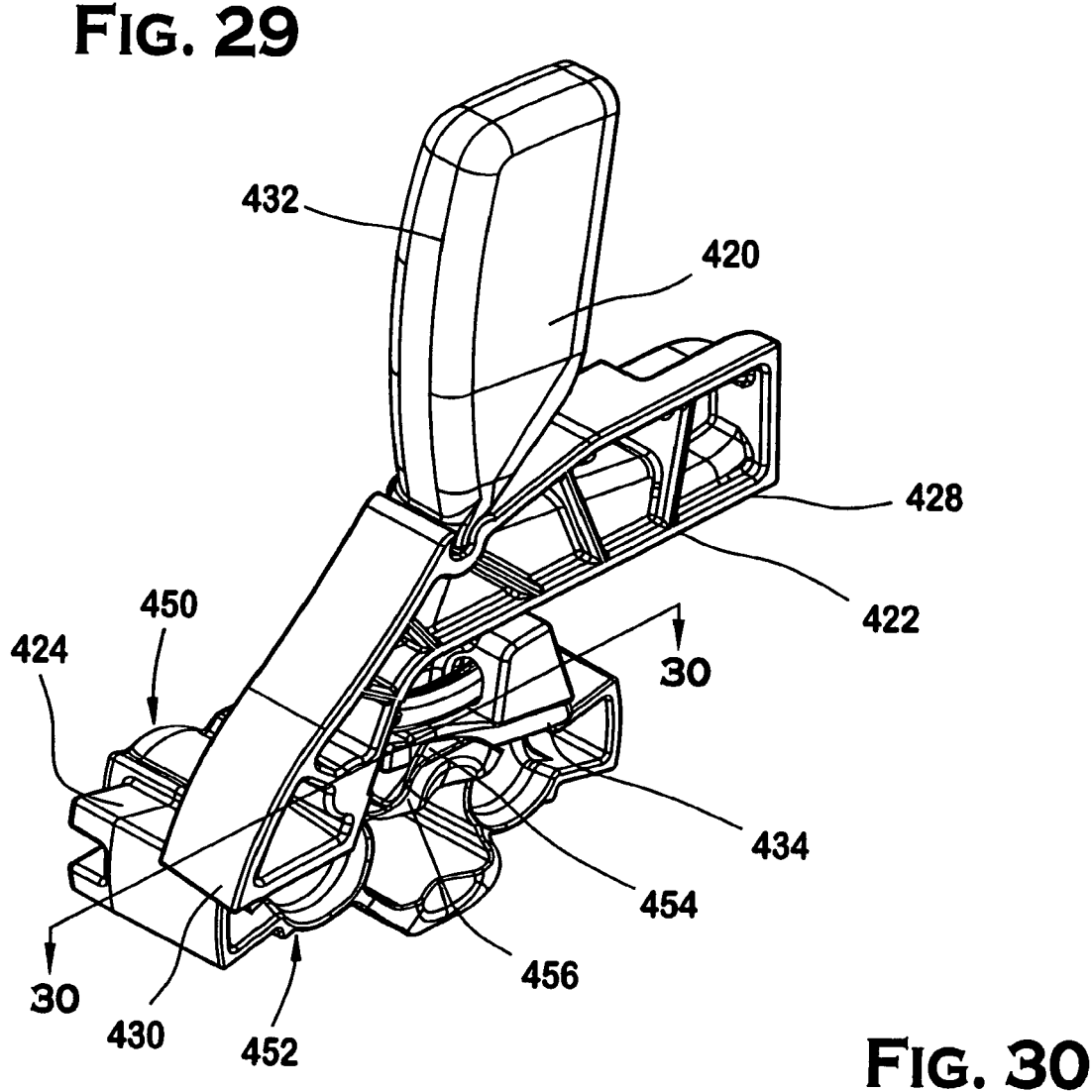
FIG. 29 is a perspective view of the handle actuator as shown in FIG. 23 as at E.
Figure 30:
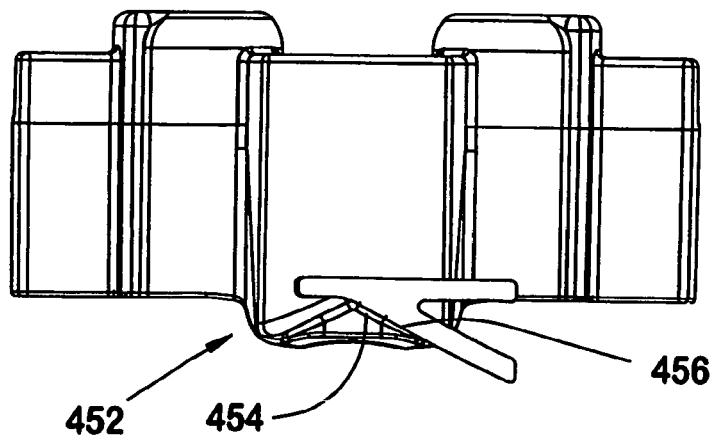
FIG. 30 illustrates the orientation of the locking mechanism taken along line 30-30 of FIG. 29.

As shown in FIGS. 24, 29 and 30, when a user pushes lever end 432 of the pivotable member 420 downwardly, the biasing end 434 of pivotable member 420 rotates upwardly moving the angled cam follower surface 456 along angled cam surface 454 and forcing the locking member 424 to be pulled toward the hub receiving portion 412 and away from opposed side hub 416 of the shell 235.

Referring to FIGS. 22 and 25-28, opposed side hub 414 has a central projection 462 positioned on a central axis CA (FIG. 22) and a plurality of circumferential projections 464 extending toward the center of the hub 416 and positioned radially to the central projection 462. As shown in FIG. 22, the central projection 462 is used to secure the hub receiving portion 412 to the side hub 416 of the shell 235 along the central axis CA so that the carrying handle 404 can rotate on a radial axis with respect to the central axis CA. As shown in FIGS. 25-28, the circumferential projections consist of six diametrically opposed minor projections 466 and alternated between six diametrically opposed major projections 468. However, the number of major and minor projections 466, 468 can vary.

The locking member 424 preferably has a central aperture 470 to receive the central projection 462 of the hub 416. The locking member 424 also preferably includes two opposed grooves 472, 474 positioned in an axis perpendicular to the axis of the first and second ends 450, 452 of the locking member 424. Each of the opposed grooves 472, 474 are configured to receive and be complimentary to the minor projections 466 of the hub 416. When the hub receiving portion 412 is secured to the side hub 416, the opposed grooves 472, 474 of the locking member 424 are secured to a pair of diametrically opposed minor projections 466 in an axis perpendicular to the central axis CA of connection between the hub receiving portion 412 of the carrying handle 404 and the side hub 416 of the shell 235.

To adjust the position of the carrying handle 404, the locking member 424 can be displaced from the minor projections 466 by pressing lever end 432 to pull the locking member 424 toward the hub receiving portion 412 and away from opposed side hub 416 of the shell 235. The plurality of circumferential projections 464 are of such a height so as to permit the locking member 424 to rotate radially about the central projection 462 when displaced from the minor projections 466 (see FIG. 26). As shown in FIGS. 25-28, the locking member 424 can be secured to the minor projections 466 to allow the carrying handle 404 to be adjusted between three positions. The side hub 316 preferably includes two diametrically opposed abutting projections positioned on the circumference of the hub 416 having a sufficient length extending parallel to the central axis CA to abut the locking member 424 when displaced from projections 466 and prevent the locking member 424 from rotating greater than 180 degrees.

FIGS. 36-40 illustrate a second embodiment of opposed handle assemblies 500, 502 for securing each arm 406, 408 of a carrying handle 404 to an infant travel seat 10. The handle attachment assemblies 500, 502 (only one being shown) preferably include a hub receiving portion 510, 512 (only one being shown) of each arm 406, 408 adapted to be secured to opposing side hubs 514, 516 (only one being shown) of the shell 235 of the seat 10 (see FIG. 1). The hub receiving portions 510, 512 are secured to the opposing side hubs along a central axis CA similar to the first embodiment. Only one of the opposed handle attachment assemblies 500, 502 will be described in detail below, however, both of the attachment assemblies 500, 502 are preferably identical.

The hub receiving portion 512 includes actuating assembly 516 comprising a button 518 and a spring biased locking member 520. The button has first and second ends 520, 524. The second end 524 of the button has opposed sides 526, 528 and is adapted to be received within a slot 530 in arm 408 proximate to the hub receiving portion 512. The sides 526, 528 of the button 518 define a channel 532. The first end 522 of the button 518 extends outwardly through slot 530 of arm 408.

The spring biased locking member 520 preferably comprises a locking end 534 and a biasing end 536. The locking end has a locking head 538 that extends parallel to the central axis CA. The locking end 534 also includes a centrally located ovate aperture 540 extending along the central axis CA. When the hub receiving portion 512 is connected to side hub 516 of the shell 235, a central projection 542 of the hub 516 extending along the central axis CA is received into the ovate aperture 540 of the locking end 538.

The biasing end 536 of the spring biased locking member 520 is preferably defines a groove 544 surrounded by two opposed abutting members 546, 548. The groove is adapted to be received within the channel 532 of sides 526, 528 of the button 518. A spring 529 is connected to the biasing end 536 to bias the spring biased locking member away from button 518.

In addition, side 526 of button 518 has an angled surface 550 that abuts a complimentary angled surface 552 of the abutting member 548, and urges the button out of slot 530 in a resting state. When the first end 522 of the button 518 is pressed downwardly by a user, angled surface 550 of button 518 slides against a complimentary angled surface 552 of abutting member 548 and pulls the locking member 520 in a direction perpendicular to the central axis CA toward button 518.

The side hub 516 has a central projection 542 positioned on the central axis CA and a plurality of circumferential projections 554 extending toward the center of the hub 516 and positioned radially to the central projection. As shown in FIGS. 37-40, the plurality of circumferential projections 554 can consist of four diametrically opposed minor projections 556 and two diametrically opposed major projections 558. However, the number of projections 554 may vary.

The locking head 538 of the locking member 520 is configured to have two opposed engaging heads 560, 562. Each of the engaging heads 560, 562 is configured to fit between two of the plurality of circumferential projections 554 in an axis perpendicular to the central axis CA to secure the handle 404 in a stationary position.

The carrying handle 404 is adapted to be radially adjusted about the central axis CA. To adjust the position of the carrying handle 404, the engaging heads 560, 562 of the locking member 520 are displaced from projections 554 by pressing the first end 522 of button 518 downward to pull the locking member 520 toward button 518 and allowing central projection 542 to slide along the ovate aperture 540. The minor projections 556 have a width extending perpendicular to the central axis CA so as to permit the locking head 538 to rotate radially about the minor projections 556 when displaced from the securement between the projections 554. As shown in FIGS. 37-40, the locking head 538 can be secured between projections 554 to allow the carrying handle 404 to be adjusted between three positions. The side hub 516 preferably includes two diametrically opposed major projections 558 having a sufficient width extending perpendicular to the central axis CA to abut the locking head 538 when displaced from projections 554 and prevent the locking head 538 from rotating greater than 180 degrees.

Figure 31:
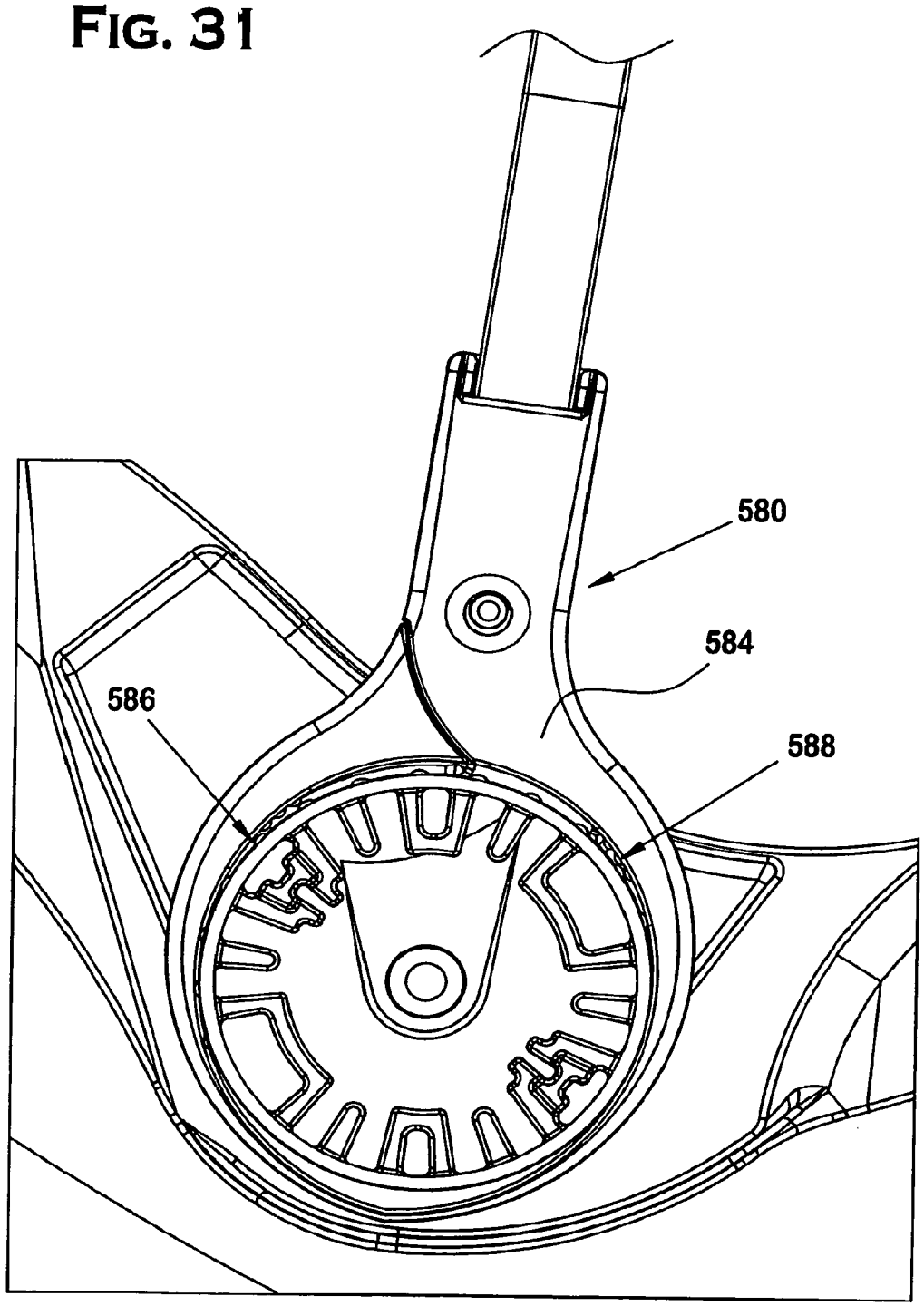
FIG. 31 is a fragmentary side view of a canopy attachment mechanism for the infant travel seat.

FIGS. 1, 22, and 31 illustrate a ratcheting canopy 580 that can be attached to the infant travel seat 10. The ratcheting canopy preferably comprises a pair of rings 582, 584 that can be secured to the exterior surface of side of hubs 414, 416 of the shell 235. For purposes of simplicity, only one ratcheting canopy connection will be described below. The exterior surface of side hub 416 includes a plurality of circumferential projections 586 extending radially around the hub 416. The interior surface of ring 584 includes a plurality of circumferential projections 588 extending radially around the ring 584 to mate with the circumferential projections 586 of the hub 416 to form a secure connection between the ring 584 and the hub 416.

While various methods, configurations, and features of the present invention have been described above and shown in the drawings for the various embodiments of the present invention, those of ordinary skill in the art will appreciate from this disclosure that any combination of the above features can be used without departing from the scope of the present invention. Accordingly, it is recognized by those skilled in the art that changes may be made to the above described methods and embodiments of the invention without departing from the broad inventive concept thereof. It is understood, therefore, that this invention is not limited to the particular methods and embodiments disclosed, but is intended to cover all modifications which are within the spirit and scope of the invention as defined by the appended claims and/or shown in the attached drawings.

What is claimed is:

1. A multi-point locking system for a carseat comprising:
    a base having an upper surface, a lower surface, front and rear ends, and left and right sides, the lower surface dimensioned to rest upon a vehicle seat;
    a seat having a seating surface and an exterior surface, the exterior surface comprising left and right sides and a bottom surface;
    four locking points to removably engage the seat to the base comprising two spaced apart rear locking points positioned toward the rear end of the base and two spaced apart front locking points positioned toward the front end of the base, the two spaced apart front locking points comprise left and right retractable securing projections that extend from the exterior surface of the seat in a direction perpendicular to the respective left and right sides of the seat and slots defined in the upper surface of the base that are positioned to engage the left and right retractable securing projections; and
    an actuator control to release the engagement between the seat and the base.

2. The multi-point locking system of claim 1, wherein the rear locking points comprise a pair of securing latches and a complementary pair of receiving apertures.

3. The multi-point locking system of claim 2, wherein the securing latches extend from the base and the receiving apertures are defined in the exterior surface of the seat.

4. The multi-point locking system of claim 1, wherein the left and right retractable securing projections are spring biased to extend outwardly from the left and right sides of the seat.

5. The multi-point locking system of claim 1, wherein the actuator control is positioned on the exterior surface of the seat.

6. A system for locking together a plurality of parts of a multi-part travel seat, the system comprising:
    a base comprising an upper surface that receives a passenger seat, front and rear ends, opposed sides, two spaced apart rear locking points positioned toward the rear end of the base, two spaced apart front locking points positioned toward the front end of the base, and a lower surface configured to rest on a vehicle seat;
    a passenger seat that is dimensioned to be received by the upper surface of the base comprising a seating surface, left and right sides, a bottom surface, two rear locking elements that are respectively positioned and configured for releasable engagement with the rear locking points of the base and two side locking elements that are respectively positioned to releasable engage the front locking points of the base in a direction that is perpendicular to the respective left and right sides of the seat; and
    an actuator positioned at a head end of a seat back portion of the passenger seat and connected to the locking elements of the passenger seat to release the locking engagement between the locking elements of the passenger seat and the locking points of the base.

7. A carseat comprising:
    a base having an upper surface, a lower surface, front and rear ends, and left and right sides, the lower surface dimensioned to rest upon a vehicle seat;
    a seat having a seating surface, left and right sides, and a bottom surface, the seat dimensioned to engage the upper surface of the base;
    a multi-point locking system to removably engage the seat to the base comprising two vertical points of engagement between the bottom surface of the seat and the upper surface of the base and two side points of engagement between the seat and the base, the two side points of engagement comprise left and right slots that receive complementary left and right retractable securing projections, the left and right retractable securing projections extend in a direction that is perpendicular to the respective left and right sides of the seat; and
    an actuator control to release the engagement between the seat and the base.

8. The carseat of claim 7, wherein the two vertical points of engagement comprise a pair of securing latches positioned toward the rear end of the base which extend vertically away from the base and a complementary pair of receiving apertures defined in the exterior bottom surface of the seat, the receiving apertures receive the opposed securing latches to secure the seat to the base.

9. The carseat of claim 7, wherein the left and right slots are defined in the base and the left and right retractable securing projections extend from the left and right sides of the seat, the left and right slots receive the retractable projections to secure the seat to the base.

10. The carseat of claim 7, wherein the seat comprises a seat back including a head end, and the actuator control is positioned at the head end of the seat back.

11. A locking system for connecting a plurality of parts of a multi-part carseat, the system comprising:
    a base comprising an upper surface that receives a passenger seat, front and rear ends, opposed sides and a bottom surface dimensioned to rest upon a vehicle seat, the base including four locking points comprising two spaced apart rear locking points positioned toward the rear end of the base and two spaced apart front locking points positioned toward the front end of the base;
    a passenger seat that is dimensioned to be received by the upper surface of the base comprising a seating surface, left and right sides, a bottom surface, two rear locking elements engageable with the two rear locking points of the base, and two side locking elements positioned to extend in a direction that is perpendicular to the respective left and right sides of the seat that are engageable with the two front locking points of the base; and
    an actuator that releases the locking engagement between the seat and the base.

12. A locking system for connecting a plurality of parts associated with a multi-part carseat, the system comprising:
    a base having an upper surface configured to receive a passenger seat, front and rear ends, opposed sides, a bottom surface configured to rest upon a vehicle seat, and four spaced apart locking points, the four spaced apart locking points comprising two locking points positioned toward the rear end of the base and two locking points positioned toward the front end of the base;

a passenger seat that is configured to be received on the upper surface of the base having a seating portion and a seat back portion, the passenger seat having four locking elements that engage with the four locking points of the base; and, an actuator positioned at a head end of the seat back portion of the passenger seat that releases the four locking elements of the passenger seat from engagement with the four locking points of the base.

13. The locking system of claim 12, wherein the actuator is connected to the locking elements of the passenger seat to control the engagement between the locking elements of the passenger seat and the locking points of the base.

* * * * *